US012698008B2

(12) United States Patent
Kume et al.

(10) Patent No.: US 12,698,008 B2
(45) Date of Patent: Aug. 4, 2026

(54) VEHICLE CONTROL DEVICE AND VEHICLE CONTROL METHOD

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 185 days.

(21) Appl. No.: 18/581,447

(22) Filed: Feb. 20, 2024

(65) Prior Publication Data

US 2024/0190478 A1     Jun. 13, 2024

Related U.S. Application Data

(63) Continuation of application No. PCT/JP2022/027193, filed on Jul. 11, 2022.

(30) Foreign Application Priority Data

| Aug. 25, 2021 | (JP) | ................................ 2021-137129 |
| May 12, 2022 | (JP) | ................................ 2022-079012 |

(51) Int. Cl.
B60W 60/00 (2020.01)
B60W 30/12 (2020.01)
(Continued)

(52) U.S. Cl.
CPC ...... B60W 60/00274 (2020.02); B60W 30/12 (2013.01); B60W 30/16 (2013.01);
(Continued)

(58) Field of Classification Search
CPC ........... B60W 60/00274; B60W 30/12; B60W 30/16; B60W 60/0055; B60W 60/0011;
(Continued)

(56) References Cited

U.S. PATENT DOCUMENTS

| 2005/0270177 A1* | 12/2005 | Mori | ......................... B60T 7/12 340/932.2 |
| 2011/0137488 A1* | 6/2011 | Sakugawa | ......... B60W 50/0097 701/1 |

(Continued)

FOREIGN PATENT DOCUMENTS

| JP | 2011005920 A | 1/2011 |
| JP | 2013018298 A * | 1/2013 |

(Continued)

OTHER PUBLICATIONS

JP-2019093807-A machine translation (Year: 2019).*

(Continued)

*Primary Examiner* — Angelina M Shudy
(74) *Attorney, Agent, or Firm* — Harness, Dickey & Pierce, PLC

(57) ABSTRACT

A technique for a vehicle configured to execute automated driving without monitoring obligation is described. A traveling environment of the vehicle is specified. Parallel-traveling avoiding control is executed based on the traveling environment specified by the traveling environment specifying unit during the automated driving without monitoring obligation. The parallel-traveling avoiding control is travel control of the vehicle to avoid a parallel traveling state in which the vehicle and an adjacent vehicle traveling in an adjacent lane adjacent to a traveling lane of the vehicle travel in parallel.

19 Claims, 14 Drawing Sheets

(51) Int. Cl.
*B60W 30/16* (2020.01)
*B60W 40/08* (2012.01)
*B60W 50/14* (2020.01)

(52) U.S. Cl.
CPC . *B60W 60/0055* (2020.02); *B60W 2040/0827* (2013.01); *B60W 2050/146* (2013.01); *B60W 60/0011* (2020.02); *B60W 2554/406* (2020.02); *B60W 2754/20* (2020.02)

(58) Field of Classification Search
CPC ... B60W 2040/0827; B60W 2050/146; B60W 2554/406; B60W 2754/20; B60W 60/0015; B60W 30/0956; B60W 2552/30; B60W 2554/802; B60W 2720/10; B60W 2754/30; G08G 1/16; G05D 1/00; G01C 21/00
See application file for complete search history.

(56) References Cited

U.S. PATENT DOCUMENTS

| | | | |
|---|---|---|---|
| 2017/0101096 A1* | 4/2017 | Kim | B60W 30/16 |
| 2017/0236422 A1* | 8/2017 | Naka | G08G 1/165 |
| | | | 701/301 |
| 2017/0334454 A1* | 11/2017 | Abe | B60W 50/0098 |
| 2017/0349172 A1* | 12/2017 | Kubota | B60W 30/09 |
| 2017/0369055 A1* | 12/2017 | Saigusa | G08G 1/096775 |
| 2018/0038952 A1* | 2/2018 | Shokonji | G01S 15/86 |
| 2018/0326981 A1* | 11/2018 | Nakamura | B60W 30/143 |
| 2019/0118811 A1* | 4/2019 | Watanabe | B60K 31/0008 |
| 2019/0270452 A1* | 9/2019 | Katsura | B60W 30/10 |
| 2019/0270453 A1* | 9/2019 | Katsura | B60Q 1/346 |
| 2019/0359215 A1 | 11/2019 | Shimakage | |
| 2019/0367026 A1* | 12/2019 | Hattori | G05D 1/0044 |
| 2020/0070834 A1* | 3/2020 | Mizoguchi | G08G 1/0125 |
| 2020/0148205 A1* | 5/2020 | Yoshida | B60W 60/00 |
| 2020/0180436 A1* | 6/2020 | Obiagwu | G09G 3/3406 |
| 2020/0226927 A1* | 7/2020 | Iwasaki | G06V 20/58 |
| 2020/0339128 A1* | 10/2020 | Kanoh | B62D 6/00 |
| 2021/0068737 A1* | 3/2021 | Ghannam | B60W 60/001 |
| 2021/0171042 A1 | 6/2021 | Hayakawa et al. | |
| 2022/0080996 A1* | 3/2022 | Brown | B60W 30/143 |
| 2022/0081005 A1* | 3/2022 | Brown | G08G 1/162 |
| 2022/0118982 A1* | 4/2022 | Ito | B60W 60/001 |
| 2022/0144257 A1* | 5/2022 | Maeda | B60W 30/095 |
| 2023/0192131 A1* | 6/2023 | Burtch | B60W 30/09 |
| | | | 701/23 |
| 2023/0373526 A1* | 11/2023 | Shimotani | B60W 50/14 |
| 2024/0262353 A1* | 8/2024 | Komori | B60W 40/105 |
| 2024/0317274 A1* | 9/2024 | Kume | B60W 60/005 |
| 2024/0416915 A1* | 12/2024 | Hayakawa | B60W 30/16 |

FOREIGN PATENT DOCUMENTS

| | | | | |
|---|---|---|---|---|
| JP | 2017043193 A | * | 3/2017 | |
| JP | 2019001451 A | * | 1/2019 | |
| JP | 2019093807 A | * | 6/2019 | |
| JP | 2020158090 A | * | 10/2020 | |
| JP | 2021000945 A | * | 1/2021 | |
| JP | 2021028206 A | | 2/2021 | |
| WO | WO-2018047291 A1 | | 3/2018 | |
| WO | WO-2018230152 A1 | | 12/2018 | |
| WO | WO-2019043847 A1 | | 3/2019 | |
| WO | WO-2020049722 A1 | | 3/2020 | |

OTHER PUBLICATIONS

JP-2013018298-A machine translation (Year: 2013).*
JP-2017043193-A machine translation (Year: 2017).*
JP-2020158090-A machine translation (Year: 2020).*
JP-2021000945-A machine translation (Year: 2021).*
JP-2019001451-A machine translation (Year: 2019).*

* cited by examiner

FIG. 3

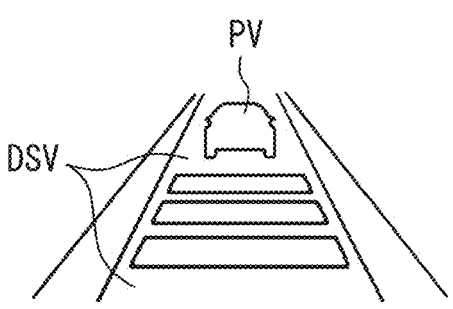

FIG. 4

```
                    ( START )
                        |
        S1              ↓                    NO
          ┌──< AT LV3 OR HIGHER? >──────────────────────┐
          │        |                                     │
          │       YES                                    │
        S2 ↓                          NO                 │
          ┌──< AREA-LIMITED LV3? >──────────┐            │
          │        |                        │            │
          │       YES          S4           ↓     NO     │
          │                     ┌──< CONGESTION- >───────┤
          │                     │    ONLY LV3?           │
          │                     │       |                │
          │                     │      YES               │
   S3 ┌───────────────────┐     │                        │
      │  PROCESS FOR       │     │                        │
      │  AREA-LIMITED LV3  │     │                        │
      └───────────────────┘  S5 ┌──────────────────────┐ │
          │                     │  PROCESS FOR          │ │
          │                     │  CONGESTION-ONLY LV3  │ │
          │                     └──────────────────────┘ │
          │                          │       S6 ┌──────────────────┐
          │                          │          │  PROCESS FOR      │
          │                          │          │  LV4 OR HIGHER    │
          │                          │          └──────────────────┘
          │                          ↓                  ↓
          └──────────────────────────┴──────────────────┘
                        |
      NO    S7          ↓
     ┌──< END TIMING? >
     │        |
     └────────┘
             YES
              ↓
          ( END )
```

FIG. 15

VEHICLE CONTROL DEVICE AND VEHICLE CONTROL METHOD

CROSS REFERENCE TO RELATED APPLICATIONS

The present application is a continuation application of International Patent Application No. PCT/JP2022/027193 filed on Jul. 11, 2022, which designated the U.S. and claims the benefit of priority from Japanese Patent Application No. 2021-137129 filed on Aug. 25, 2021, and Japanese Patent Application No. 2022-079012 filed on May 12, 2022. The entire disclosures of all of the above applications are incorporated herein by reference.

TECHNICAL FIELD

The present disclosure relates to a vehicle control device and vehicle control method.

BACKGROUND

A technique is known in which a driver is permitted to perform a second task other than driving at an automated driving level at which a surrounding monitoring obligation is not required.

SUMMARY

A technique for a subject vehicle configured to execute automated driving without monitoring obligation is described. A traveling environment of the subject vehicle is specified. Parallel-traveling avoiding control is executed based on the traveling environment specified by the traveling environment specifying unit during the automated driving without monitoring obligation. The parallel-traveling avoiding control is travel control of the subject vehicle to avoid a parallel traveling state in which the subject vehicle and an adjacent vehicle travel in parallel. The adjacent vehicle travels in an adjacent lane adjacent to a traveling lane of the subject vehicle.

BRIEF DESCRIPTION OF DRAWINGS

The details of one or more embodiments are set forth in the accompanying drawings and the description below. Other features and advantages will be apparent from the description and drawings, and from the claims.

FIG. 3 is a diagram illustrating an example of display of an inter-vehicle distance set value.

FIG. 4 is a flowchart showing an example of a flow of a process related to parallel traveling avoidance in the automated driving ECU.

FIG. 15 is a diagram illustrating an example of a schematic configuration of an automated driving ECU.

DETAILED DESCRIPTION

Figure 1:
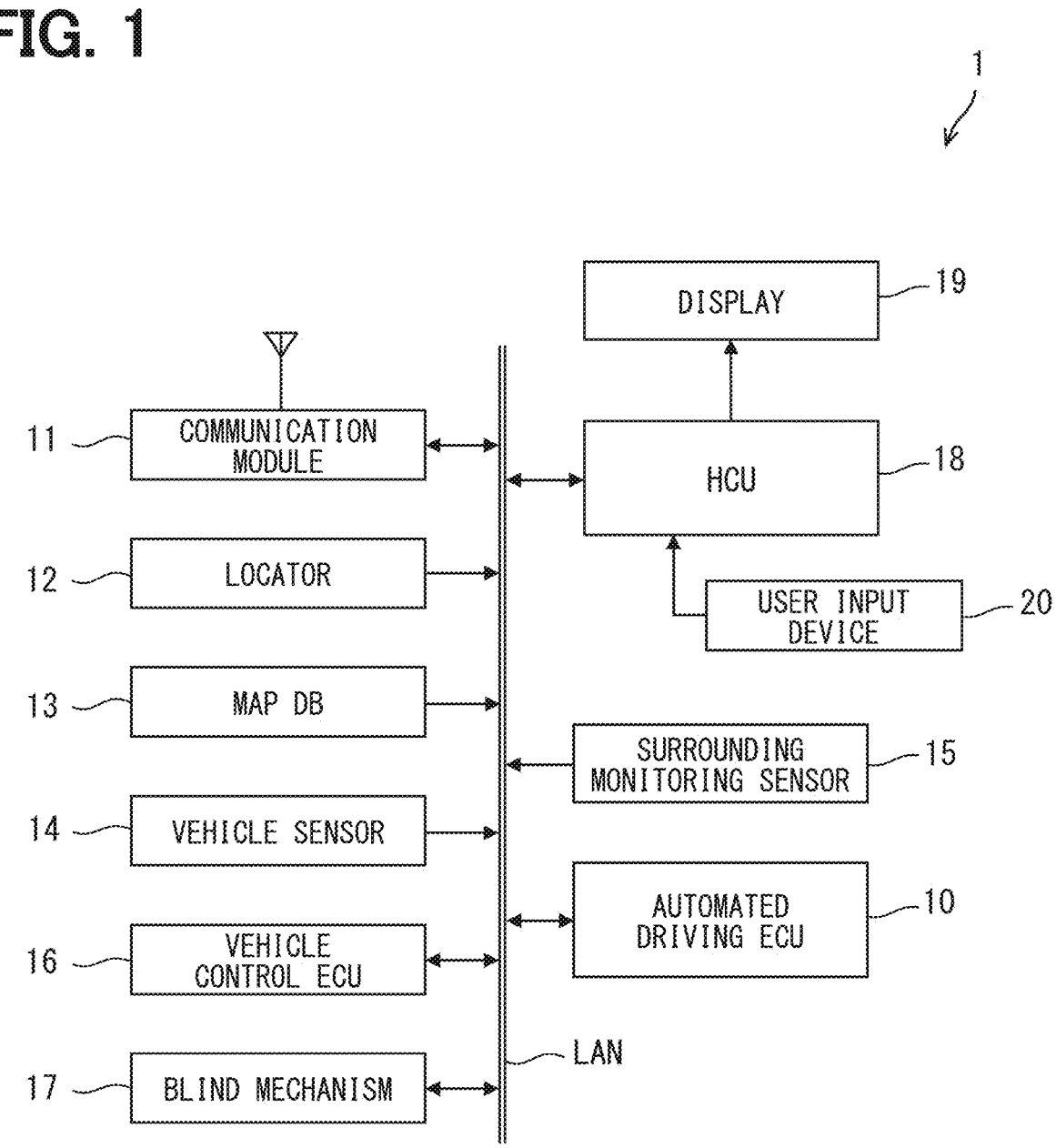
FIG. 1 is a schematic diagram illustrating a configuration of a vehicle system.

According to a comparative example, an offset control is executed for offsetting a traveling position of a subject vehicle in a vehicle width direction so as to increase a distance from another vehicle traveling in parallel with the subject vehicle at a high-level automated driving level at which a driver is not required to be obliged to monitor surroundings. In addition, a driver is permitted to perform a second task other than driving at an automated driving level at which a surrounding monitoring obligation is not required.

In the comparative example, the distance in the vehicle width direction between the subject vehicle and the parallel traveling vehicle can be increased. However, continuation of a parallel traveling state of the subject vehicle with the parallel traveling vehicle may allow an occupant of the parallel travelling vehicle to see a driver of the subject vehicle performing the second task. Therefore, convenience for the driver of the subject vehicle may be deteriorated.

In contrast, according to the present disclosure, a vehicle control device and a vehicle control method are capable of preventing deterioration in convenience of a driver during automated driving without an obligation of surrounding monitoring.

According to an aspect of the present disclosure, a vehicle control device is configured to be used in a subject vehicle configured to execute automated driving without monitoring obligation. The automated driving without monitoring obligation is automated driving in which there is no obligation of surrounding monitoring. The vehicle control device includes a traveling environment specifying unit configured to specify a traveling environment of the subject vehicle, and a parallel-traveling avoiding unit configured to execute parallel-traveling avoiding control based on the traveling environment specified by the traveling environment specifying unit during the automated driving without monitoring obligation. The parallel-traveling avoiding control is travel control of the subject vehicle to avoid a parallel traveling state in which the subject vehicle and an adjacent vehicle travel in parallel. The adjacent vehicle travels in an adjacent lane adjacent to a traveling lane of the subject vehicle.

According to another aspect of the present disclosure, a vehicle control method is executed by at least one processor in a subject vehicle configured to execute automated driving without monitoring obligation. The automated driving without monitoring obligation is automated driving in which there is no obligation of surrounding monitoring. In the method, a traveling environment of the subject vehicle is specified. Parallel-traveling avoiding control is executed based on the traveling environment specified in the specifying during the automated driving without monitoring obligation. The parallel-traveling avoiding control is travel control of the subject vehicle to avoid a parallel traveling state in which the subject vehicle and an adjacent vehicle travel in parallel. The adjacent vehicle travels in an adjacent lane adjacent to a traveling lane of the subject vehicle.

According to the above configuration, during the automated driving without monitoring obligation, the parallel-traveling avoiding control that is the traveling control of the subject vehicle can be executed so as to avoid the parallel traveling state in which the subject vehicle and the adjacent vehicle travel in parallel. Therefore, it is possible to prevent the adjacent vehicle and the subject vehicle from becoming in the parallel traveling state, i.e., traveling side by side during the automated driving without monitoring obligation. Therefore, it is possible to make it difficult for an occupant of the adjacent vehicle to see a second task of a driver of the subject vehicle. As a result, it is possible to prevent a decrease in convenience for the driver of the subject vehicle during the automated driving without the obligation of surroundings monitoring.

Multiple embodiments will be described with reference to the drawings. For convenience of explanation, portions having the same functions as those illustrated in the drawings used in the description among embodiments are assigned the same reference symbol, and descriptions of the same portions may be omitted. Descriptions in another embodiment may be applied for the portions assigned the same reference symbol.

First Embodiment

Hereinafter, a first embodiment of the present disclosure will be described with reference to the drawings. A vehicle system 1 shown in FIG. 1 can be used for a vehicle configured to execute automated driving. Hereinafter, the vehicle may be referred to as an automated driving vehicle. As illustrated in FIG. 1, the vehicle system 1 includes an automated driving ECU 10, a communication module 11, a locator 12, a map database (hereinafter, map DB) 13, a vehicle sensor 14, a surrounding monitoring sensor 15, a vehicle control ECU 16, a blind mechanism 17, an HCU (i.e., Human Machine Interface Control Unit) 18, a display 19, and a user input device 20. For example, the automated driving ECU 10, the communication module 11, the locator 12, the map DB 13, the vehicle sensor 14, the surrounding monitoring sensor 15, the vehicle control ECU 16, the blind mechanism 17, and the HCU 18 may be configured to be connected to an in-vehicle LAN (see "LAN" in FIG. 1). Although the vehicle including the vehicle system 1 is not necessarily limited to an automobile, a case where the vehicle system 1 is used in an automobile will be described below as an example.

There may be multiple stages (hereinafter, referred to as automation levels) of automated driving of an automated driving vehicle, for example, as defined by SAE (the Society of Automotive Engineers). The automation levels are classified into, for example, five levels including LV0 to LV5 as follows.

LV0 is a level where a driver performs all driving tasks without intervention of the system. The driving task may be rephrased as a dynamic driving task. The driving task includes, for example, steering, acceleration/deceleration, and surrounding monitoring. LV0 corresponds to so-called manual driving. LV1 is a level where the system assists steering or acceleration/deceleration. LV1 corresponds to so-called driving assistance. LV2 is a level where the system assists both steering and acceleration/deceleration. LV2 corresponds to so-called partial driving automation. The LV1 and LV2 are a part of the automated driving.

For example, the automated driving at LV1 and LV2 is automated driving in which a driver has an obligation of surrounding monitoring related to safe driving. Hereinafter, the obligation is simply referred to as a monitoring obligation. That is, this corresponds to automated driving with the monitoring obligation. The monitoring obligation includes visual monitoring of surroundings of the vehicle. The automated driving at LV1 and LV2 is, in other words, automated driving in which a second task is not permitted. The second task is an action permitted to the driver other than a driving operation, and is a predetermined specific action. The second task can also be rephrased as a secondary activity, another activity, or the like. The second task must not prevent the driver from responding to a request to take over a driving operation from an automated driving system. As an example, viewing of a content such as a video, operation of a smartphone, reading, and eating are assumed as the second task.

The LV3 of the automated driving is a level where the system performs all driving tasks under certain conditions, and the driver performs the driving operation in an emergency situation. In the automated driving at LV3, it is required that the driver can quickly respond to a request of driving takeover from the system. The driving takeover can also be reworded as transfer of the surroundings monitoring obligation from the vehicle system to the driver. LV3 corresponds to so-called conditional driving automation. The LV3 includes an area-limited LV3 limited to a specific area. The specific area described here may be an automobile road or an expressway. The specific area may be, for example, a specific lane. LV3 also includes a congestion-only LV3 that is limited to traffic congestion. The congestion-only LV3 may be limited to traffic congestion in, for example, the expressway. The expressway may include the automobile road.

LV4 of the automated driving is a level where the system is capable of executing all driving tasks, except under a specific circumstance, such as an unexpected road condition, an extreme environment, and the like. LV4 corresponds to a high driving automation. LV5 of the automated driving is a level in which the system is capable of executing all driving tasks in any situation. The LV5 corresponds to a full driving automation.

For example, the automated driving at LV3 to LV5 is an automated driving in which the driver does not have the monitoring obligation. In other words, the automated driving at LVs 3 to 5 corresponds to automated driving without the monitoring obligation. The automated driving at LV3 to LV5 is, in other words, automated driving in which the second task is permitted. Among the automated driving at LV3 to LV5, the automated driving at LV4 or higher level corresponds to the automated driving in which sleeping of the driver is permitted. In other words, the automated driving at LV4 or higher level corresponds to sleeping-allowed automated driving. Among the automated driving of LV3 to LV5, the automated driving at LV3 corresponds to automated driving in which sleeping of the driver is not permitted. In other words, the automated driving at LV3 corresponds to sleeping-disallowed automated driving.

The automated driving vehicle of the present embodiment is capable of switching the automation level. The automation level may be switchable only between some levels of the LV0 to LV5. In the present embodiment, a case where the automated driving vehicle can switch at least between the automated driving at LV4 or higher level, the automated driving at LV3, and driving at LV2 or lower level will be described as an example. Driving at LV2 or lower level includes manual driving at LV0.

The communication module 11 transmits and receives information to and from a center outside the subject vehicle via wireless communications. That is, wide area communication is performed. The communication module 11 receives, for example, traffic congestion information related to the surroundings of the subject vehicle from the center via the wide area communications. The communication module 11 may transmit and receive information to and from other vehicles via the wireless communications. In other words, the communication module 11 may execute vehicle-to-vehicle communication. The communication module 11 may transmit and receive information via the wireless communications with a roadside device installed on a roadside. In other words, the communication module 11 may execute road-to-vehicle communication. When executing the road-to-vehicle communication, the communication module 11 may receive surrounding vehicle information transmitted from a surrounding vehicle positioned around the subject vehicle through the roadside device. Further, the communication module 11 may receive information about the subject vehicle transmitted from the surrounding vehicle positioned around the subject vehicle through the center by the wide area communications.

The locator 12 includes a GNSS (Global Navigation Satellite System) receiver and an inertial sensor. The GNSS receiver is configured to receive positioning signals from multiple positioning satellites. The inertial sensor includes a gyro sensor and an acceleration sensor. The locator 12 combines the positioning signals received by the GNSS receiver with a measurement result of the inertial sensor to sequentially detect the position of the subject vehicle (hereinafter, referred to as a subject vehicle position) on which the locator 12 is mounted. The subject vehicle position may be represented by, for example, coordinates of latitude and longitude. The subject vehicle position may be measured based on also a travel distance obtained from signals sequentially output from a vehicle speed sensor mounted on the vehicle.

The map DB 13 is a non-volatile memory and stores high-definition map data. The high-definition map data is map data with higher precision than the map data used for route guidance in a navigation function. The map DB 13 may also store map data used for route guidance. The high-definition map data includes information that can be used for the automated driving operation, such as three-dimensional road shape information, information on the number of lanes, and information indicating the direction of travel for each lane. In addition, the high-definition map data may also include a node point information indicating the positions of both ends of a road marking such as a lane marking. The locator 12 may be configured without the GNSS receiver by using the three-dimensional road shape information. For example, the locator 12 may determine the subject vehicle position by using the three-dimensional road shape information and a detection result of the surrounding monitoring sensor 15 that detects feature points of the road shape and the structure. The surrounding monitoring sensor 15 is, for example, a surrounding monitoring camera or a LiDAR (Light Detection and Ranging/Laser Imaging Detection and Ranging). The three-dimensional road shape information may be generated based on a captured image by REM (Road Experience Management).

The communication module 11 may receive map data distributed from an external server through, for example, wide area communications and may store the data in the map DB 13. In this case, the map DB 13 may be a volatile memory, and the communication module 11 may sequentially acquire the map data of an area corresponding to the subject vehicle position.

The vehicle sensor 14 is a sensor group for detecting various states of the subject vehicle. The vehicle sensor 14 includes a vehicle speed sensor, a steering torque sensor, an accelerator sensor, and a brake sensor. The vehicle speed sensor detects the speed of the subject vehicle. The steering torque sensor detects a steering torque applied to a steering wheel. The accelerator sensor detects whether an accelerator pedal is depressed. The accelerator sensor may be an accelerator pedal force sensor that detects a pedal force applied to the accelerator pedal. The accelerator sensor may be an accelerator stroke sensor that detects an amount of depression of the accelerator pedal. The accelerator sensor may be an accelerator switch that outputs a signal depending on whether the accelerator pedal is depressed. The brake sensor detects whether a brake pedal is depressed. The brake sensor may be a brake pedal force sensor that detects a pedal force applied to the brake pedal. The brake sensor may be a brake stroke sensor that detects an amount of depression of the brake pedal. The brake sensor may be a brake switch that outputs a signal depending on whether the brake pedal is depressed. The vehicle sensor 14 outputs the detected sensing information to the in-vehicle LAN. The sensing information detected by the vehicle sensor 14 may be output to the in-vehicle LAN via an ECU mounted on the subject vehicle.

The surrounding monitoring sensor 15 monitors a surrounding environment of the subject vehicle. For example, the surrounding monitoring sensor 15 detects obstacles around the subject vehicle such as moving objects such as pedestrians and other vehicles, and stationary objects such as fallen objects on the road. In addition, the surrounding monitoring sensor 15 detects a road marking such as a traveling lane marking around the subject vehicle. The surrounding monitoring sensor 15 is a sensor such as a surrounding monitoring camera that captures a predetermined range around the subject vehicle, a millimeter wave radar that transmits a search wave in a predetermined range around the subject vehicle, a sonar, or a LiDAR. For example, the predetermined range may be a range at least partially including the front, rear, left, and right areas of the subject vehicle. The surrounding monitoring camera sequentially outputs, as sensing information, sequentially captured images to the automated driving ECU 10. A sensor that transmits a search wave, such as a sonar, a millimeter-wave radar, or a LIDAR, sequentially outputs a scanning result based on a reception signal obtained when a reflected wave reflected by an obstacle is received to the automated driving ECU 10 as sensing information. The sensing information detected by the surrounding monitoring sensor 15 may be output to the automated driving ECU 10 without passing through the in-vehicle LAN.

The vehicle control ECU 16 is an electronic control unit that executes traveling control of the subject vehicle. The traveling control includes an acceleration/deceleration control and/or a steering control. The vehicle control ECU 16 includes a steering ECU that executes the steering control, a power unit control ECU and a brake ECU that execute the acceleration/deceleration control. The vehicle control ECU 16 is configured to output a control signal to a traveling control device such as an electronic control throttle, a brake actuator, and an EPS (Electric Power Steering) motor mounted on the subject vehicle, thereby executing the traveling control.

The blind mechanism 17 is a mechanism that obstructs view from an occupant of an adjacent vehicle traveling in parallel with the subject vehicle to the inside of the subject vehicle. The blind mechanism 17 may be provided at a window of a door of the subject vehicle. That is, the blind mechanism 17 may be at least provided at a side window of the subject vehicle. The blind mechanism 17 may also be provided at a front window and a rear window of the subject vehicle. The blind mechanism 17 may be, for example, a light control film capable of switching between a light transmitting state and a light shielding state by application of voltage. The blind mechanism 17 may be in the light transmitting state when not in operation, and may be in the light shielding state when in operation. The blind mechanism 17 may be a configuration other than the light control film. For example, the blind mechanism 17 may be a mechanism that electrically closes a louver, a curtain, or the like to obstruct view from outside to the inside of the subject vehicle.

The HCU 18 mainly includes a computer including a processor, a volatile memory, a nonvolatile memory, an I/O, and a bus connecting these devices. The HCU 18 executes various processing related to interaction between an occupant and a system of the subject vehicle by executing a control program stored in the nonvolatile memory.

The display 19 is provided in the subject vehicle and presents information to the driver of the subject vehicle. The display 19 presents information by displaying information. The display 19 presents information in accordance with an instruction from the HCU 18. The display 19 may also present information to a passenger other than the driver. The display 19 may be, for example, a meter MID (Multi Information Display), a CID (Center Information Display), or a HUD (Head-Up Display). The meter MID is a display device located in front of a driver seat in a vehicle compartment. For example, the meter MID may be provided in a meter panel. The CID is a display device disposed at a center of an instrument panel of the subject vehicle. The HUD is provided, for example, on an instrument panel in a vehicle cabin of the subject vehicle. The HUD projects a display image formed by a projector onto a projection region defined on the front windshield serving as a projection member. A light of the display image reflected by the front windshield to the inside of the subject vehicle is perceived by the driver seated in the driver's seat. As a result, the driver can visually recognize a virtual image of the display image formed in front of the front windshield so as to overlap with a part of the landscape in front of the vehicle. The HUD may be configured to project the display image onto a combiner provided in front of the driver's seat instead of the front windshield.

The user input device 20 accepts input from the user. The user input device 20 corresponds to an input device. The user input device 20 may be an operation device that receives operation input from the user. The operation device may be a mechanical switch or a touch switch integrated with the display 19. For example, the user input device 20 may be a steering switch provided on a steering wheel. The user input device 20 is not limited to the operation device that accepts the operation input as long as the user input device 20 is a device that accepts input from the user. For example, the user input device 20 may be an audio input device that receives command input by an audio such as a voice from the user.

The automated driving ECU 10 mainly includes a computer including a processor, a volatile memory, a nonvolatile memory, an I/O, and a bus connecting these devices. The automated driving ECU 10 executes processing related to automated driving by executing a control program stored in the nonvolatile memory. The automated driving ECU 10 corresponds to a vehicle control device. The configuration of the automated driving ECU 10 will be described in detail below.

Figure 2:
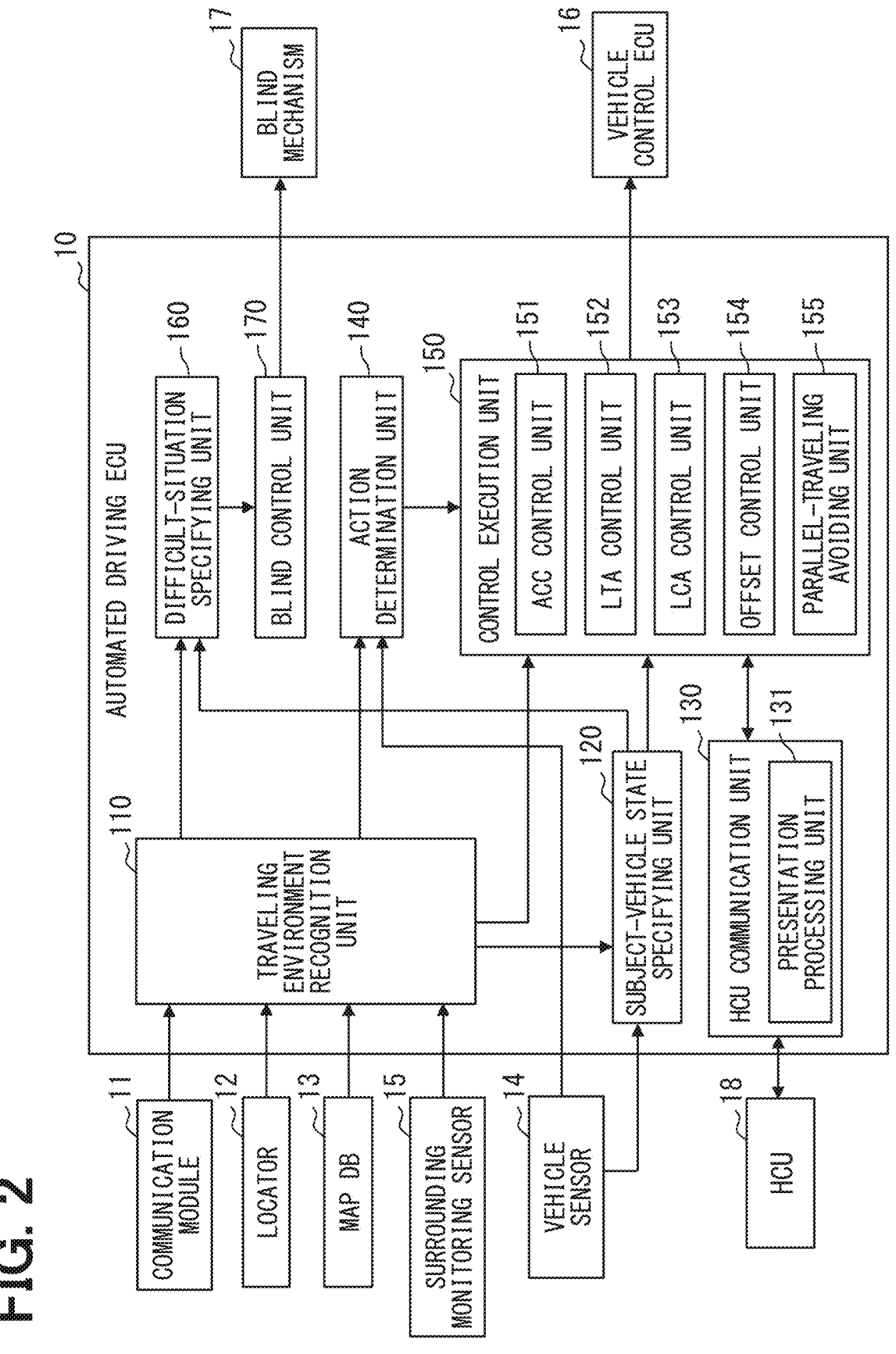
FIG. 2 is a diagram illustrating an example of a schematic configuration of an automated driving ECU.

Next, a schematic configuration of the automated driving ECU 10 will be described with reference to FIG. 2. As illustrated in FIG. 2, the automated driving ECU 10 includes a traveling environment recognition unit 110, a subject-vehicle state specifying unit 120, an HCU communication unit 130, an action determination unit 140, a control execution unit 150, a difficult-situation specifying unit 160, and a blind control unit 170 as functional blocks. The execution of the processes of the functional blocks of the automated driving ECU 10 by the computer corresponds to execution of a vehicle control method. Some or all of the functions executed by the automated driving ECU 10 may be implemented as hardware with one or more ICs or the like. Some or all of the functional blocks included in the automated driving ECU 10 may be implemented by a combination of execution of software by a processor and a hardware member.

The traveling environment recognition unit 110 recognizes a traveling environment around the subject vehicle based on the sensing information acquired from the surrounding monitoring sensor 15. The traveling environment recognition unit 110 corresponds to a traveling environment specifying unit. The processing in the traveling environment recognition unit 110 corresponds to a traveling environment determination step. For example, the traveling environment recognition unit 110 recognizes a detailed position of the subject vehicle in a travel lane of the subject vehicle (hereinafter, referred to as a subject lane) from information such as left and right lane markings of the subject lane. In addition, the traveling environment recognition unit 110 recognizes the position, size, and speed of an obstacle such as a surrounding vehicle around the subject vehicle. The traveling environment recognition unit 110 recognizes the position, size, and speed of an obstacle such as a vehicle in the subject lane. The traveling environment recognition unit 110 recognizes a position, a size, and a speed of an obstacle such as a vehicle in a nearby lane near to the subject lane. The nearby lane is a lane other than the subject lane in a road section where the subject vehicle is located. The nearby lane includes, for example, an adjacent lane which is a lane adjacent to the subject lane.

The traveling environment recognition unit 110 may recognize the traveling environment around the subject vehicle based on, for example, the subject vehicle position acquired from the locator 12, the map data acquired from the map DB 13, the information on other vehicles acquired by the communication module 11, in addition to the sensing information acquired from the surrounding monitoring sensor 15. For example, based on these pieces of information, the traveling environment recognition unit 110 generates a virtual space in which an actual traveling environment is reproduced.

The traveling environment recognition unit 110 may also determine a manual driving area (hereinafter, referred to as an MD area) in a traveling area of the subject vehicle. The traveling environment recognition unit 110 may also determine an automated driving area (hereinafter, referred to as an AD area) in the traveling area of the subject vehicle. The traveling environment recognition unit 110 may also determine an ST section and a non-ST section, which will be described later, in the AD area.

The MD area is an area where automated driving is prohibited. In other words, the MD area is an area where the driver performs all of a longitudinal control, a lateral control and surrounding monitoring of the subject vehicle. A longitudinal direction is a direction that coincides with a front-rear direction of the subject vehicle. A lateral direction is a direction that coincides with a right-left direction of the subject vehicle, i.e., width direction of the subject vehicle. The longitudinal control corresponds to acceleration-deceleration control of the subject vehicle in the longitudinal direction. The lateral control corresponds to steering control of the subject vehicle in the lateral direction. For example, the MD area may be a general road.

The AD area is an area where automated driving is permitted. In other words, the AD area is defined as an area in which the subject vehicle can replace the driver to execute one or more of the longitudinal control, the lateral control, and the periphery monitoring. For example, the AD area may be the expressway or the automobile road. The automated driving at the congestion-only LV3 (hereinafter referred to as congestion-only automated driving) may be configured, for example, to be permitted only during the traffic congestion in the AD area.

The AD area is divided into the ST section and the non-ST section. The ST section is a section in which the automated driving at the area-limited LV3 (hereinafter referred to as area-limited automated driving) is permitted. The area-limited automated driving may be configured to be permitted only in specific lanes in the ST section. The non-ST section is a section in which the automated driving at LV2 or lower level is permitted. In the present embodiment, the non-ST section in which the automated driving at LV1 is permitted and the non-ST section in which the automated driving at LV2 is permitted are not divided. The ST section may be, for example, a traveling section in which the high accuracy map data is prepared. The non-ST section may be set to a section that does not correspond to the ST section in the AD area.

The traveling environment recognition unit 110 recognizes a positional relationship between the subject vehicle and a vehicle (hereinafter, referred to as an adjacent vehicle) traveling in the adjacent lane. The traveling environment recognition unit 110 recognizes a longitudinal positional relationship between the adjacent vehicle and the subject vehicle. The traveling environment recognition unit 110 may recognize that the adjacent vehicle and the subject vehicle are in a parallel traveling state when at least parts of vehicle bodies of the adjacent vehicle and the subject vehicle overlap each other in the longitudinal direction. The traveling environment recognition unit 110 may exclude a state in which the positions of the side doors of the adjacent vehicle and the subject vehicle do not overlap each other in the longitudinal direction from the parallel traveling state. The range occupied by the vehicle body of the subject vehicle may be determined based on vehicle body data stored in advance in the nonvolatile memory. The opposite lane of the subject lane may not be included in the adjacent lane or may be included in the adjacent lane.

The opposite lane opposite to the subject lane in traveling direction may be included in the adjacent lane. This is because even a vehicle in the opposite lane may be kept side by side with the subject vehicle during traffic congestion, for example. When the opposite lane opposite to the subject lane in traveling direction is included in the adjacent lane, the side-by-side state may be included in the parallel traveling state. In addition, the traveling environment recognition unit 110 may exclude the opposite lane from the adjacent lane in a section in which there is a structure that separates the subject lane and the opposite lane by a certain distance or a shield wall on the basis of the map acquired from the map DB 13. According to this configuration, it is possible to save an effort of including such opposite lane, from which it is difficult to see the inside of the subject vehicle, in the adjacent lane. Here, the certain distance may be arbitrarily set at a distance at which it is estimated to be difficult to see the inside of the subject vehicle.

The traveling environment recognition unit 110 may also recognize in the lateral direction whether the lane in which the adjacent vehicle travels is a passing lane. In Japan, the passing lane is the rightmost lane among multiple lanes in the same direction. In the United States and Germany, the passing lane is located on the left side of the subject lane among multiple lanes in the same direction. In China, the passing lane is the leftmost lane among multiple lanes in the same direction.

The traveling environment recognition unit 110 may also recognize traffic congestion in a section in which the subject vehicle travels. For example, traffic congestion in a section in which the subject vehicle travels may be recognized from traffic congestion information around the subject vehicle received from the center via the communication module 11. In addition, the traveling environment recognition unit 110 may recognize traffic congestion in a section in which the subject vehicle travels by combining information on the position and speed of another vehicle recognized based on the sensing information acquired from the surrounding monitoring sensor 15 and information on the speed of the subject vehicle acquired from the vehicle speed sensor of the vehicle sensor 14. For example, traffic congestion in the section in which the subject vehicle travels may be recognized based on the large number of other vehicles around the subject vehicle and the low speeds of the subject vehicle and the vehicles in front of and behind the subject vehicle. The traveling environment recognition unit 110 may recognize traffic congestion in a section in which the subject vehicle travels by means other than the above-described manners.

The subject-vehicle state specifying unit 120 specifies the state of the subject vehicle. The subject-vehicle state specifying unit 120 specifies various states of the subject vehicle according to the sensing information acquired from the vehicle sensor 14. The subject-vehicle state specifying unit 120 may specify a more detailed state of the subject vehicle using the traveling environment of the subject vehicle recognized by the traveling environment recognition unit 110 in addition to the sensing information acquired from the vehicle sensor 14. For example, the subject-vehicle state specifying unit 120 may specify stop of the subject vehicle in a traffic congestion. That is, the subject-vehicle state specifying unit 120 corresponds to an in-congestion stop specifying unit. In this case, the subject-vehicle state specifying unit 120 may specify the stop of the subject vehicle in the traffic congestion based on the recognition result of the traveling environment recognition unit 110. The subject-vehicle state specifying unit 120 may specify the stop of the subject vehicle based on information on the speed of the subject vehicle acquired from the vehicle speed sensor of the vehicle sensor 14.

The HCU communication unit 130 executes a process of outputting information to the HCU 18 and a process of acquiring information from the HCU 18. The HCU communication unit 130 sequentially outputs, to the HCU 18, information (hereinafter, referred to as AD-related information) related to an implementation status of the automated driving of the subject vehicle. The HCU communication unit 130 includes a presentation processing unit 131 as a sub-functional block. The presentation processing unit 131 indirectly controls display on the display 19. The presentation processing unit 131 causes the HCU 18 to control display on the display 19 by outputting the above-described AD-related information and the like to the HCU 18. The presentation processing unit 131 may also be configured to output an instruction on what kind of display is to be shown to the HCU 18, thereby displaying the instruction on the display 19 via the HCU 18. In addition, the presentation processing unit 131 may be configured not to output an instruction on what kind of display is to be shown, and the HCU 18 may be configured to cause the display 19 to show display according to a combination of output information. The presentation processing unit 131 corresponds to a display instruction unit.

In addition, the HCU communication unit 130 acquires, from the HCU 18, setting information (hereinafter, referred to as AD setting information) regarding automated driving received by the HCU 18 via the user input device 20. Examples of the AD setting information include a set value of a vehicle speed (hereinafter, referred to as a set vehicle speed) and a set value of an inter-vehicle distance (hereinafter, referred to as an inter-vehicle distance set value) used in ACC control described later. The set vehicle speed may be a value that changes in increments of 1 km/h, for example. The inter-vehicle distance set value may be a value classified into multiple levels such as "large", "medium", and "small". In this example of the present embodiment, the inter-vehicle distance set value is divided into three levels of "large", "medium", and "small". In addition, the examples of the AD setting information include information on ON/OFF setting of the function of the automated driving.

The action determination unit 140 switches a control subject of a driving operation of the subject vehicle between the driver and the system of the subject vehicle. The action determination unit 140 determines a traveling plan to travel the subject vehicle based on the recognition result of the traveling environment by the traveling environment recognition unit 110 when the system has a right to control the driving operation. The travel plan may be determined as a route to the destination and a behavior to be taken by the subject vehicle in order to arrive at a destination. Examples of the behavior include going straight, turning right, turning left, and changing lanes.

The action determination unit 140 switches the automation level of the automated driving of the subject vehicle as necessary. The action determination unit 140 determines whether increase in automation level is permitted. For example, the action determination unit 140 may determine that switching from the manual driving to the automated driving at LV2 or lower level is permitted, when the subject vehicle travels from the MD area to the non-ST section of the AD area. The action determination unit 140 may determine that switching from the manual driving at LV0 to the area-limited automated driving at LV3 is permitted, when the subject vehicle travels from the MD area to the ST section of the AD area. The action determination unit 140 may determine that switching from the automated driving at LV2 or lower level to the automated driving at LV3 is permitted, when the subject vehicle travels from the non-ST section to the ST section in the AD area. The action determination unit 140 may determine that switching from the automated driving at LV2 or lower level to the automated driving at the congestion-only LV3 is permitted, when the subject vehicle is located in the AD area, the automation level is at LV2 or lower level, and all the conditions for the congestion-only LV3 are satisfied. In addition, the action determination unit 140 may determine that switching from LV3 or lower level to LV4 is permitted when a start condition of LV4 is satisfied. The action determination unit 140 may increase the automation level when increase in the automation level is determined to be permitted and the driver approves the increase in the automation level.

The action determination unit 140 may lower the automation level when the automation level is determined to need to be lowered. Cases where it is determined that the automation level needs to be lowered include a case where an override is detected, a case where the driving operation is switched according to a plan (i.e., planned switching of the driving operation), and a case where the driving operation is switched out of the plan (i.e., unplanned switching of the driving operation). The override is an operation for the driver of the subject vehicle to voluntarily acquire the control right of the subject vehicle. In other words, the override is an operational intervention by the driver of the subject vehicle. The action determination unit 140 may detect the override from the sensing information obtained from the vehicle sensor 14. For example, the action determination unit 140 may detect the override when the steering torque detected by the steering torque sensor exceeds a threshold value. The action determination unit 140 may detect the override when the accelerator sensor detects depression of the accelerator pedal. In addition, the action determination unit 140 may detect the override when the brake sensor detects depression of the brake pedal.

The planned switching of the driving operation is determined by the system. For example, the planned switching of the driving operation is executed when the subject vehicle travels from the ST section of the AD area to the non-ST section or the MD area. In this case, the automation level drops from the area-limited LV3 to LV2 or lower level. The planned switching of the driving operation may be executed when the subject vehicle travels from the non-ST section of the AD area to the MD area. In this case, the automation level drops from the area-limited LV3 to LV0. The unplanned switching of the driving operation is an unplanned sudden switching determined by the system. For example, the unplanned switching of the driving operation is executed when the conditions for the congestion-only LV3 are no longer satisfied during the automated driving at the congestion-only LV3. In this case, the automation level drops from the congestion-only LV3 to LV2 or lower level. Multiple types of conditions may be used as the conditions for the congestion-only LV3. Examples of the conditions may be that the subject vehicle is in the AD area, that the vehicle speed of the preceding vehicle or the subject vehicle is equal to or less than a threshold value at which traffic congestion is estimated, and that the subject vehicle is in a congestion section obtained from congestion information. The unplanned switching of the driving operation may be executed when the automation level cannot be maintained due to a failure in recognition of the traveling environment by the traveling environment recognition unit 110.

When the system of the subject vehicle has a right to control the driving operation, the control execution unit 150 executes various controls for driving the subject vehicle according to a travel plan determined by the action determination unit 140, in cooperation with the vehicle control ECU 16. The control execution unit 150 includes an ACC (Adaptive Cruise Control) control unit 151, an LTA (Lane Tracing Assist) control unit 152, an LCA (Lane Change Assist) control unit 153, an offset control unit 154, and a parallel-traveling avoiding unit 155 as sub-functional blocks.

The ACC control unit 151 executes ACC control. The ACC control includes a constant speed travel control for causing the subject vehicle to travel at a constant speed at a set vehicle speed, and a following travel control for causing the subject vehicle to travel following a preceding vehicle. The ACC control unit 151 may execute the following travel control when a preceding vehicle is present within a predetermined range in front of the subject vehicle. When there is no preceding vehicle within the predetermined range in front of the subject vehicle, the ACC control unit 151 may execute the constant speed traveling control. The ACC control unit 151 corresponds to a following travel control unit. In the following travel, acceleration/deceleration control is executed so as to maintain an inter-vehicle distance between the subject vehicle and a nearest preceding vehicle (hereinafter, referred to as a preceding vehicle) at a target inter-vehicle distance. The target inter-vehicle distance may be set according to the speed of the subject vehicle and the inter-vehicle distance set value. The target inter-vehicle distance has a constant allowable range for each inter-vehicle distance set value. Alternatively, the allowable range may vary depending on the inter-vehicle distance set value. The allowable range can be rephrased as a range in which the subject vehicle is assumed to be at the target inter-vehicle distance and the acceleration/deceleration control is not executed. The set vehicle speed and the inter-vehicle distance set value may be values included in the AD-related information acquired by the HCU communication unit 130. That is, the ACC control unit 151 executes the following travel control such that the subject vehicle is kept at the target inter-vehicle distance. The target inter-vehicle distance has the constant allowable range for each set value and depends on the set value received from the driver via the user input device 20.

The presentation processing unit 131 displays the inter-vehicle distance set value on the display 19 during execution of the ACC control. The inter-vehicle distance set value is output by the HCU communication unit 130 as a part of the AD-related information, and the HCU 18 may use the inter-vehicle distance set value. The display 19 for displaying the inter-vehicle distance set value may be, for example, a meter MID. Here, an example of the display of the inter-vehicle distance set value will be described with reference to FIG. 3. PV in FIG. 3 indicates a mark representing a preceding vehicle. DSV in FIG. 3 indicates a mark representing the inter-vehicle distance set value. In the example of FIG. 3, the inter-vehicle distance set value is represented by the number of marks DSV. Specifically, when the inter-vehicle distance set value is "large", three marks DSV are displayed as in the example of FIG. 3. When the inter-vehicle distance set value is "medium", two marks DSV are displayed. When the inter-vehicle distance set value is "small", one mark DSV is displayed.

The LTA control unit 152 executes LTA control for maintaining in-lane traveling of the subject vehicle. In the LTA control, steering control is executed so as to keep the subject vehicle traveling within the lane. That is, in the LTA control, lane keeping control, i.e., automatic lane keeping is executed. For example, the LTA control unit 152 may maintain the in-lane traveling by controlling the steering angle of the steering wheel of the subject vehicle on the basis of the position of the lane marking or the position of the road edge recognized by the traveling environment recognition unit 110. For example, by default, the LTA control unit 152 may execute control such that the center of the subject lane coincides with the traveling position of the subject vehicle. When the traveling position of the subject vehicle is aligned with the center of the subject lane, for example, the center of the axle of the subject vehicle may be aligned with the center of the subject lane.

The LCA control unit 153 executes LCA control for causing the subject vehicle to automatically change lanes from the subject lane to the adjacent lane. The LCA control unit 153 may execute the LCA control using a position and speed of a vehicle around the subject vehicle recognized by the traveling environment recognition unit 110. For example, the LCA control may be executed when a speed of a preceding vehicle in front of the subject vehicle is a low speed equal to or lower than a predetermined value and no surrounding vehicle approaching to a lateral side or a rear side of the subject vehicle exists. The LCA control unit 153 may execute the LCA control by causing the vehicle control ECU 16 to execute the acceleration/deceleration control and the steering control.

The control execution unit 150 executes the automated driving at LV2 or higher by executing both the ACC control and LTA control. The LCA control may be executable, for example, when the ACC control and the LTA control are being executed. The control execution unit 150 may execute the automated driving at LV1 by executing either one of the ACC control and the LTA control.

The offset control unit 154 executes offset control for offsetting the traveling position of the subject vehicle in the vehicle width direction so as to automatically increase the distance to a vehicle located on the lateral side of the subject vehicle. A vehicle to be a target in the offset control may be an adjacent vehicle traveling in parallel with the subject vehicle. The parallel traveling state may be recognized by the traveling environment recognition unit 110. The adjacent vehicle in the parallel traveling state is hereinafter referred to as a parallel traveling vehicle. For example, in the offset control, when the distance to the parallel traveling vehicle is equal to or less than a threshold value, the traveling position of the subject vehicle may be offset such that a distance larger than the threshold value is provided between the subject vehicle and the parallel traveling vehicle. The threshold mentioned here may be a value that can be arbitrarily set. In addition, when the offset control is executed for both the right and left parallel traveling vehicles on the left and right sides of the subject vehicle, the offset may be executed so as to maintain the distance from each of the left and right parallel traveling vehicles.

When the offset control is executed during the execution of the LTA control, the LTA control unit 152 may execute control to maintain the in-lane traveling while offsetting the traveling position of the subject vehicle in the vehicle width direction so as to increase the distance to the parallel traveling vehicle.

The parallel-traveling avoiding unit 155 executes parallel-traveling avoiding control that is traveling control of the subject vehicle to avoid the parallel traveling state in which the adjacent vehicle and the subject vehicle travel in parallel. The processing in the parallel-traveling avoiding unit 155 corresponds to a parallel-traveling avoiding control step. Examples of the parallel-traveling avoiding control include the longitudinal control and the lateral control. Examples of the longitudinal control include control for decreasing the inter-vehicle distance between the subject vehicle and the preceding vehicle, control for increasing the inter-vehicle distance between the subject vehicle and the preceding vehicle, control for accelerating the subject vehicle, and control for decelerating the subject vehicle. The control for reducing the inter-vehicle distance between the subject vehicle and the preceding vehicle and the control for accelerating the subject vehicle are hereinafter referred to as forward control. The control for increasing the inter-vehicle distance between the subject vehicle and the preceding vehicle and the control for decelerating the subject vehicle are hereinafter referred to as backward control. For example, when there is a preceding vehicle in front of the subject vehicle, the control for decreasing the inter-vehicle distance between the subject vehicle and the preceding vehicle may be executed as the forward control. When there is no preceding vehicle, control for accelerating the subject vehicle may be executed as the forward control. In addition, when there is a preceding vehicle in front of the vehicle, the control for increasing the inter-vehicle distance between the subject vehicle and the preceding vehicle may be executed as the backward control. When there is no preceding vehicle, the control for decelerating the subject vehicle may be executed as the backward control.

Examples of the lateral control include control for changing lanes. The lane change may be executed by the LCA control unit 153. Hereinafter, a case where the parallel-traveling avoiding unit 155 executes only the longitudinal control among the longitudinal control and the lateral control will be described as an example.

The parallel-traveling avoiding unit 155 executes the parallel-traveling avoiding control to avoid the parallel traveling state in which the adjacent vehicle and the subject vehicle travel in parallel, based on the traveling environment recognized by the traveling environment recognition unit 110 during the automated driving without the monitoring obligation. When the ACC control unit 151 is not executing the following travel control, the parallel-traveling avoiding unit 155 may execute the longitudinal control until the subject vehicle and the adjacent vehicle are out of the parallel traveling state, i.e., the subject vehicle is no longer traveling in parallel with the adjacent vehicle. According to this configuration, it is possible to prevent the adjacent vehicle and the subject vehicle from being in the parallel traveling state during the automated driving without the monitoring obligation. Therefore, it is possible to make it difficult for the occupant of the adjacent vehicle to see the second task of the driver of the subject vehicle. As a result, it is possible to prevent a decrease in convenience for the driver of the subject vehicle during the automated driving without the obligation of surroundings monitoring.

When the ACC control unit 151 is executing the following travel control, the parallel-traveling avoiding unit 155 may execute the longitudinal control within the allowable range of the target inter-vehicle distance. According to this configuration, the parallel-traveling avoiding control can be executed in parallel with the following travel control. In this case, the presentation processing unit 131 may display the inter-vehicle distance set value that has been received from the driver via the user input device 20 even during the parallel-traveling avoiding control. Since the allowable range of the target inter-vehicle distance is not exceeded even during the parallel-traveling avoiding control, the display of the inter-vehicle distance set value that has been received from the driver via the user input device 20 does not become erroneous. When the inter-vehicle distance set value that has been received from the driver via the user input device 20 is "large", the display in which the number of marks DSV is three may be maintained as in the example of FIG. 3 even during the parallel-traveling avoiding control.

The parallel-traveling avoiding unit 155 may not execute the parallel-traveling avoiding control during the automated driving with the monitoring obligation. According to this configuration, since the driver does not execute the second task during the automated driving without the monitoring obligation, unnecessary parallel-traveling avoiding control can be avoided. The parallel-traveling avoiding unit 155 may not execute the parallel-traveling avoiding control even during the manual driving. According to this, since the driver does not execute the second task during the manual driving, unnecessary parallel-traveling avoiding control can be avoided.

The parallel-traveling avoiding unit 155 may execute the parallel-traveling avoiding control in a case where the parallel traveling state between the adjacent vehicle and the subject vehicle has continued for a certain time or more during the automated driving without the monitoring obligation. According to this configuration, it is possible to reduce unnecessary execution of the parallel-traveling avoiding control for a short time of passing by the adjacent vehicle.

The parallel-traveling avoiding unit 155 may preferentially execute the backward control during the area-limited automated driving, and may preferentially execute the forward control during the congestion-only automated driving. The preferential execution of the backward control means that the backward control is executed when the backward control and a control other than the backward control can resolve the parallel traveling state, i.e., cause the subject vehicle and the adjacent vehicle to become out of the parallel traveling state. When the backward control cannot cause the subject vehicle and the adjacent vehicle to become out of the parallel traveling state, and the control other than the backward control can cause the subject vehicle and the adjacent vehicle to become out of the parallel traveling state, the control other than the backward control may be executed. The preferential execution of the forward control means that the forward control is executed when the forward control and a control other than the forward control can cause the subject vehicle and the adjacent vehicle to become out of the parallel traveling state. When the forward control cannot cause the subject vehicle and the adjacent vehicle to become out of the parallel traveling state, and the control other than the forward control can cause the subject vehicle and the adjacent vehicle to become out of the parallel traveling state, the control other than the forward control may be executed.

During the congestion-only automated driving, the inter-vehicle distances between the subject vehicle and vehicles in front of and behind the subject vehicle are small due to traffic congestion, and thus it is difficult to widen the inter-vehicle distance between the subject vehicle and a preceding vehicle. On the other hand, during the congestion-only automated driving, since the vehicle speed of the subject vehicle is low due to traffic congestion, there is room for reducing the inter-vehicle distance between the subject vehicle and the preceding vehicle. In addition, during the area-limited automated driving, it is possible to travel at high speed, and thus it is difficult to reduce the inter-vehicle distance between the subject vehicle and the preceding vehicle. Therefore, according to the above-described configurations, it is possible to execute the parallel-traveling avoiding control suitable for each of the area-limited automated driving and the congestion-only automated driving.

The parallel-traveling avoiding unit 155 may preferentially execute the control for increasing the inter-vehicle distance between the subject vehicle and the preceding vehicle during the area-limited automated driving, and preferentially execute the control for decreasing the inter-vehicle distance between the subject vehicle and the preceding vehicle during the congestion-only automated driving.

When the adjacent vehicle is determined to be located in the passing lane based on the traveling environment recognized by the traveling environment recognition unit 110, the parallel-traveling avoiding unit 155 may execute the control for decelerating the subject vehicle as the parallel-traveling avoiding control in preference to a control other than the control for decelerating the subject vehicle. The fact that the adjacent vehicle is located in the passing lane may be specified from the recognition result of the traveling environment recognition unit 110. The preferential execution of the control for decelerating the subject vehicle over the control other than the control for decelerating the subject vehicle means that the control for decelerating the subject vehicle is executed when both the control for decelerating the subject vehicle and the control other than the control for decelerating the subject vehicle can cause the subject vehicle and the adjacent vehicle to become out of the parallel traveling state. When the control for decelerating the subject vehicle cannot cause the subject vehicle and the adjacent vehicle to become out of the parallel traveling state, and the control other than the control for decelerating the subject vehicle can cause the subject vehicle and the adjacent vehicle to become out of the parallel traveling state, the control other than the control for decelerating the subject vehicle may be executed.

When the adjacent vehicle is determined to be located in the passing lane, prompting the adjacent vehicle to overtake the subject vehicle may easily cause the subject vehicle and the adjacent vehicle to become out of the parallel traveling state. Therefore, according to the above configuration, the subject vehicle and the adjacent vehicle can more easily become out of the parallel traveling state.

In a situation where the offset control by the offset control unit 154 is required, the parallel-traveling avoiding unit 155 may execute the parallel-traveling avoiding control in parallel with the offset control. The situation in which the offset control is required may be a situation in which the vehicle bodies of the adjacent vehicle and the subject vehicle partially overlap each other in the longitudinal direction. According to the above configuration, it is possible to reduce anxiety of the occupant of the subject vehicle by preventing the inter-vehicle distance in the lateral direction from being excessively reduced, and to prevent a decrease in convenience of the driver during the automated driving without the obligation of surrounding monitoring.

The parallel-traveling avoiding unit 155 may not execute the parallel-traveling avoiding control when the subject-vehicle state specifying unit 120 has specified that the subject vehicle stops in traffic congestion. This is because it is difficult to shift the position of the subject vehicle forward or backward when the subject vehicle stops in traffic congestion even during automated driving without the obligation of surrounding monitoring, and execution of the parallel-traveling avoiding control may be useless.

The difficult-situation specifying unit 160 may specify a parallel-traveling avoiding difficult situation in which it is difficult for the parallel-traveling avoiding unit 155 to prevent the adjacent vehicle and the subject vehicle from becoming in the parallel traveling state. The difficult-situation specifying unit 160 may determine that at lease one of a situation in which the subject vehicle is stopped and a situation in which it is difficult to move the position of the subject vehicle relative to the front and rear vehicles back and forth is the parallel-traveling avoiding difficult situation.

The difficult-situation specifying unit 160 may specify the stop of the subject vehicle based on the specified result of the subject-vehicle state specifying unit 120. The situation in which it is difficult to move the position of the subject vehicle relative to the front and rear vehicles back and forth is, for example, a situation in which there is no room to execute the parallel-traveling avoiding control in the inter-vehicle distance between the subject vehicle and the front and rear vehicles during traffic congestion. Such a situation may be specified from the recognition result of the traveling environment recognition unit 110.

The blind control unit 170 may execute blind control to operate the blind mechanism 17 when the difficult-situation specifying unit 160 specifies the parallel-traveling avoiding difficult situation during the automated driving without the monitoring obligation. According to this, even when the parallel-traveling avoiding control cannot cause the subject vehicle and the adjacent vehicle to become out of the parallel traveling state, it is possible to make it difficult for the occupant of the adjacent vehicle to see the state of the second task of the driver in the subject vehicle by operating the blind mechanism 17.

The blind control unit 170 may be prohibited to execute the blind control during the sleeping-disallowed automated driving, but may be permitted to execute the blind control during the sleeping-allowed automated driving. This is because, when the blind mechanism 17 is also provided at both the front window and the rear window, it is assumed that the blind mechanism 17 cannot be operated unless the automation level is high.

Here, an example of a flow of a process (hereinafter, a parallel-traveling avoiding-related process) related to the parallel-traveling avoiding control in the automated driving ECU 10 will be described with reference to flowcharts of FIGS. 4 to 7. The flowchart shown in FIG. 4 may start, for example, if a switch (hereinafter, referred to as a power switch) for starting an internal combustion engine or a motor generator of the subject vehicle is turned on. In addition, if the automated driving function can be switched on and off, a situation where the automated driving function is on may be added to the condition for starting the process.

First, in step S1, when the automation level of the subject vehicle is determined to be equal to or higher than LV3 (YES in S1), the process proceeds to step S2. On the other hand, when the automation level of the subject vehicle is determined to be lower than LV3 (NO in S1), the process proceeds to step S7. The automation level of the subject vehicle may be specified by the action determination unit 140.

In step S2, when the automation level of the subject vehicle is the area-limited LV3 (YES in S2), the process proceeds to step S3. On the other hand, when the automation level of the subject vehicle is not the area-limited LV3 (NO in S2), the process proceeds to step S4. In step S3, a process for the area-limited LV3 is executed, and the process proceeds to step S7. Here, an example of a flow of the process for the area-limited LV3 will be described with reference to the flowchart of FIG. 5.

First, in step S31, when the traveling environment recognition unit 110 has specified that the subject vehicle and the adjacent vehicle are in the parallel traveling state (YES in S31), the process proceeds to step S32. On the other hand, when the traveling environment recognition unit 110 has not specified that the subject vehicle and the adjacent vehicle are in the parallel traveling state (NO in S31), the process proceeds to step S36.

In step S32, when the state in which the traveling environment recognition unit 110 has specified that the subject vehicle and the adjacent vehicle are in the parallel traveling state continues for the certain time (YES in S32), the process proceeds to step S33. On the other hand, when the state in which the subject vehicle and the adjacent vehicle are specified to be in the parallel traveling state does not continue for the certain time (NO in S32), the process proceeds to step S36.

In step S33, when the traveling environment recognition unit 110 specifies that the adjacent vehicle is located in the passing lane (YES in S33), the process proceeds to step S34. On the other hand, when the traveling environment recognition unit 110 specifies that the adjacent vehicle is located outside the passing lane (NO in S33), the process proceeds to step S35.

In step S34, the parallel-traveling avoiding unit 155 preferentially executes the control for decelerating the subject vehicle as the parallel-traveling avoiding control over the control other than the control for decelerating the subject vehicle. On the other hand, in step S35, the backward control is preferentially executed as the parallel-traveling avoiding control.

In step S36, when a condition for the area-limited LV3 is not satisfied and the automated driving at the area-limited LV3 is canceled (YES in S36), the process proceeds to step S7. On the other hand, when the condition for the area-limited LV3 is satisfied (NO in S36), the process returns to S31 and the process is repeated. The condition for the area-limited LV3 may be, for example, that the subject vehicle is located in the ST section.

Figure 5:
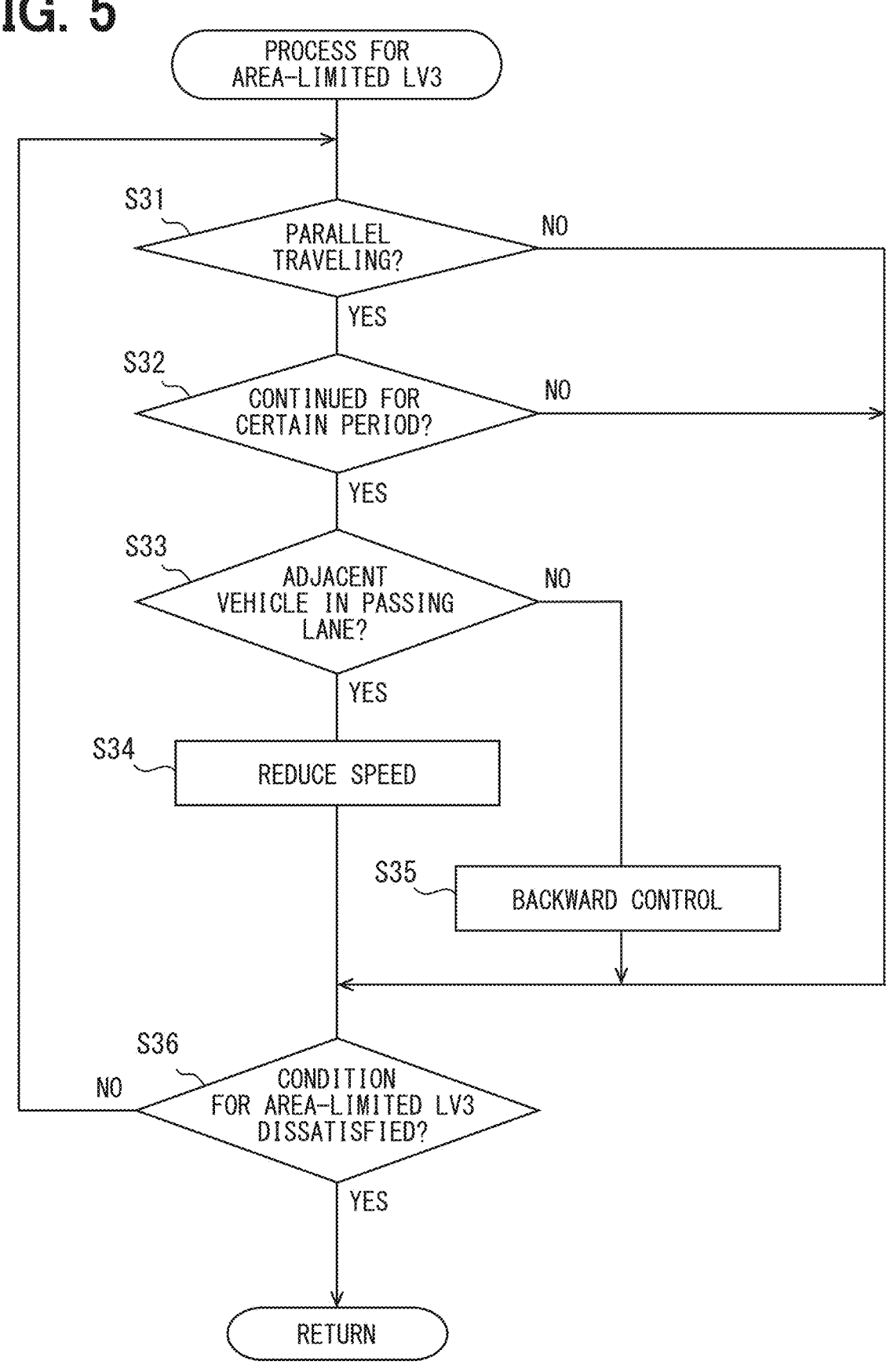
FIG. 5 is a flowchart illustrating an example of a flow of a process for an area-limited LV3 in the automated driving ECU.

In the flowchart of FIG. 5, the process of S32 may be omitted. The processes of S33 and S34 may be omitted, and the process may proceed to S35 in the case of YES in S32.

Returning to FIG. 4, in step S4, when the automation level of the subject vehicle is the congestion-only LV3 (YES in S4), the process proceeds to step S5. On the other hand, when the automation level of the subject vehicle is not the congestion-only level LV3 and the automation level is equal to or higher than the level LV4 (NO in S4), the process proceeds to step S6. In step S5, the process for the congestion-only LV3 is executed, and the process proceeds to step S7. Here, an example of a flow of the process for the congestion-only LV3 will be described with reference to the flowchart of FIG. 6.

First, in step S51, when the traveling environment recognition unit 110 has specified that the subject vehicle and the adjacent vehicle are in the parallel traveling state (YES in S51), the process proceeds to step S52. On the other hand, when the traveling environment recognition unit 110 has not specified that the subject vehicle and the adjacent vehicle are in the parallel traveling state (NO in S51), the process proceeds to step S55.

In step S52, when the state in which the traveling environment recognition unit 110 has specified that the subject vehicle and the adjacent vehicle are in the parallel traveling state continues for the certain time (YES in S52), the process proceeds to step S53. On the other hand, when the state in which the subject vehicle and the adjacent vehicle are specified to be in the parallel traveling state does not continue for the certain time (NO in S52), the process proceeds to step S55.

In step S53, when the subject-vehicle state specifying unit 120 has specified that the subject vehicle stops in the traffic congestion (YES in S53), the process proceeds to step S55. On the other hand, when the stop of the subject vehicle in the traffic congestion is not specified (NO in S53), the process proceeds to step S54. In step S54, the parallel-traveling avoiding unit 155 preferentially executes the forward control as the parallel-traveling avoiding control.

In step S55, when a condition for the congestion-only LV3 is not satisfied and the automated driving at the congestion-only LV3 is canceled (YES in S55), the process proceeds to step S7. On the other hand, when the condition for the congestion-only LV3 is satisfied (NO in S55), the process returns to S51 and the process is repeated. The condition for the congestion-only LV3 may be, for example, that the subject vehicle is located in the AD area and the traveling environment recognition unit 110 recognizes traffic congestion in a section in which the subject vehicle travels.

Figure 6:
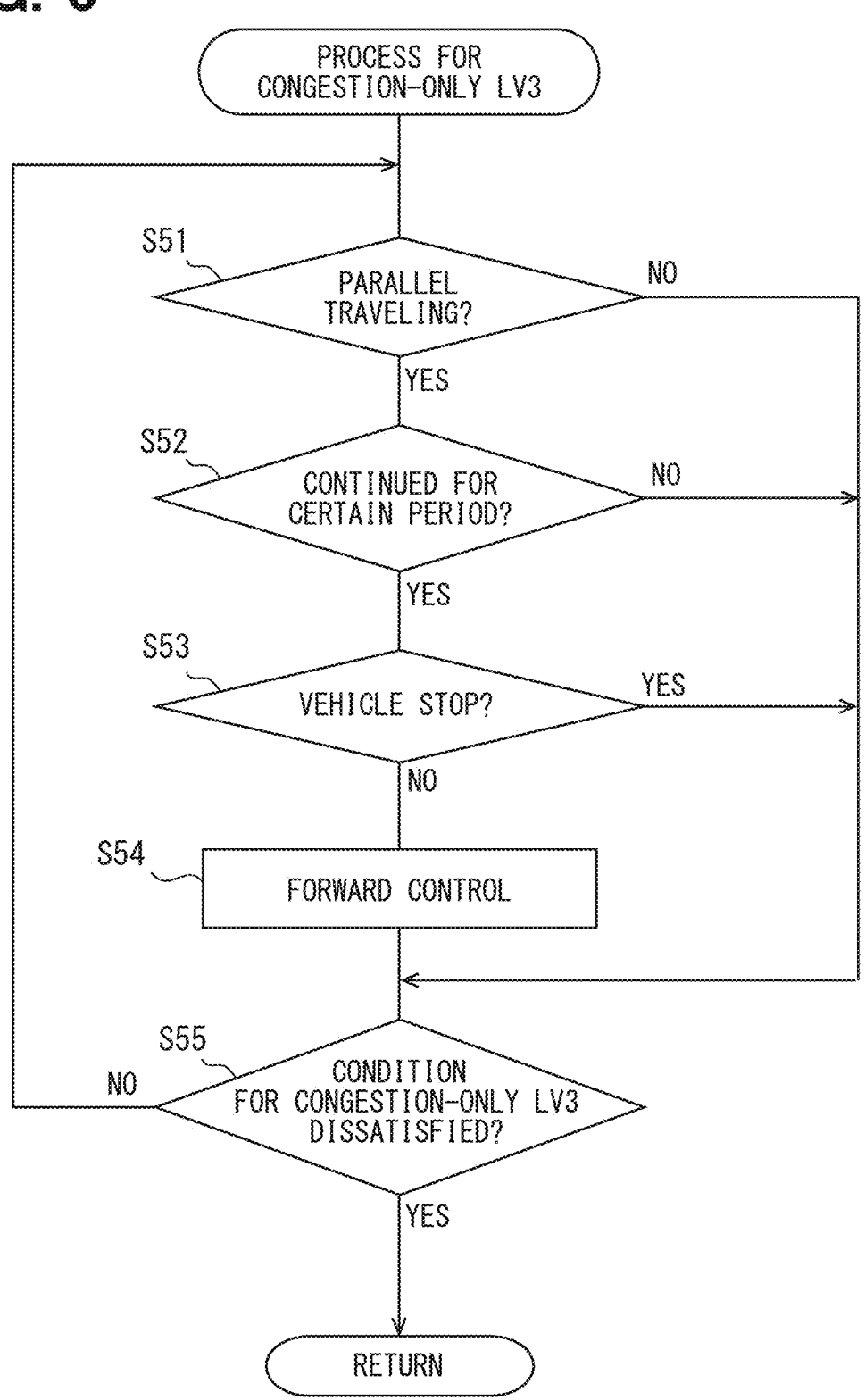
FIG. 6 is a flowchart illustrating an example of a flow of a process for a congestion-only LV3 in the automated driving ECU.

In the flowchart of FIG. 6, the process of S52 may be omitted. The process of S53 may be omitted.

Returning to FIG. 4, in step S6, a process for LV4 or higher level is executed, and the process proceeds to step S7. Here, an example of a flow of the process LV4 or higher level will be described with reference to the flowchart of FIG. 7.

First, in step S61, when the traveling environment recognition unit 110 has specified that the subject vehicle and the adjacent vehicle are in the parallel traveling state (YES in S61), the process proceeds to step S62. On the other hand, when the traveling environment recognition unit 110 has not specified that the subject vehicle and the adjacent vehicle are in the parallel traveling state (NO in S61), the process proceeds to step S70.

In step S62, when the state in which the traveling environment recognition unit 110 has specified that the subject vehicle and the adjacent vehicle are in the parallel traveling state continues for the certain time (YES in S62), the process proceeds to step S63. On the other hand, when the state in which the subject vehicle and the adjacent vehicle are specified to be in the parallel traveling state does not continue for the certain time (NO in S62), the process proceeds to step S70.

In step S63, when the difficult-situation specifying unit 160 specifies the parallel-traveling avoiding difficult situation (YES in S63), the process proceeds to step S67. On the other hand, when the parallel-traveling avoiding difficult situation is not specified (NO in S63), the process proceeds to step S64.

In step S64, when the traveling environment recognition unit 110 specifies that the adjacent vehicle is located in the passing lane (YES in S64), the process proceeds to step S65. On the other hand, when it is determined that the adjacent vehicle is located outside the passing lane (NO in S64), the process proceeds to step S66.

In step S65, the parallel-traveling avoiding unit 155 preferentially executes the control for decelerating the subject vehicle as the parallel-traveling avoiding control over the control other than the control for decelerating the subject vehicle. On the other hand, in step S66, the parallel-traveling avoiding control is executed. As the parallel-traveling avoiding control, the forward control may be executed or the backward control may be executed in step S66. For example, when the traveling environment recognition unit 110 recognizes traffic congestion in a section in which the subject vehicle travels, the forward control may be preferentially executed, and when traffic congestion is not recognized, the backward control may be preferentially executed.

In step S67, the blind control unit 170 executes the blind control, and the process proceeds to step S68. In step S68, when the traveling environment recognition unit 110 specifies that the subject vehicle and the adjacent vehicle are in the parallel traveling state (YES in S68), the process of S68 is repeated. On the other hand, when it is not specified that the subject vehicle and the adjacent vehicle are in the parallel traveling state (NO in S68), the process proceeds to step S69. In step S69, the blind control unit 170 ends the blind control, and the process proceeds to step S70.

Figure 7:
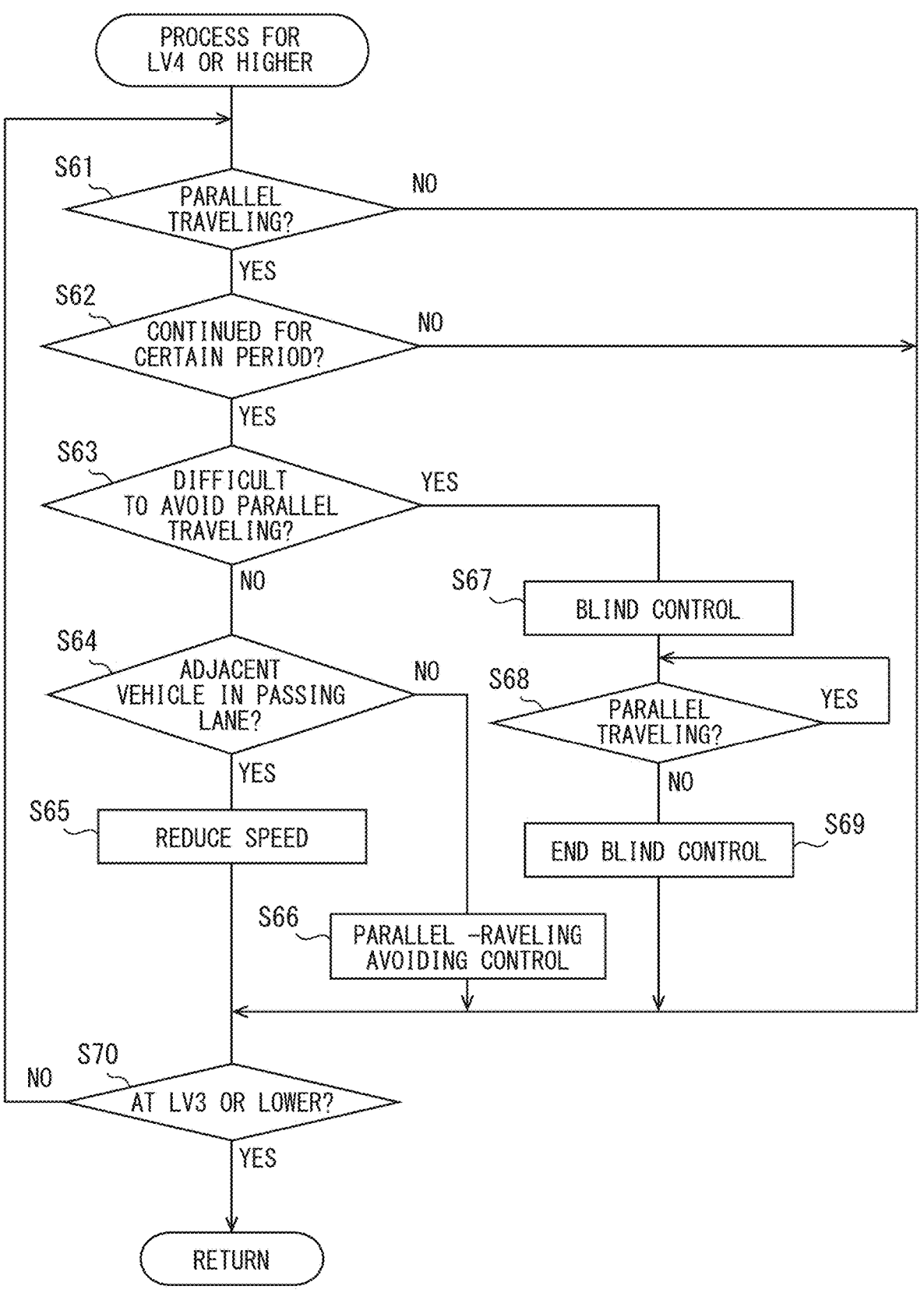
FIG. 7 is a flowchart illustrating an example of a flow of a process for LV4 or higher level in the automated driving ECU.

In the flowchart of FIG. 7, the process of S62 may be omitted. The processes of S63 and S67 to S69 may be omitted, and the process may proceed to S64 in the case of YES in S62. The processes of S64 and S65 may be omitted, and the process may proceed to S66 in the case of NO in S63. The processes of S63 to S65 and S67 to S69 may be omitted, and the process may proceed to S66 in the case of YES in S62.

Returning to FIG. 4, in step S7, when it is the end timing of the parallel-traveling avoiding-related process (YES in S7), the parallel-traveling avoiding-related process is ended. On the other hand, when it is not the end timing of the parallel-traveling avoiding-related process (NO in S7), the process returns to S1 to repeat the process. Examples of the end timing of the parallel-traveling avoiding-related process include a timing when the power switch is turned off and a timing when the automated driving function is turned off.

In the flowchart of FIG. 7, the blind control is executed without executing the parallel-traveling avoiding control when the parallel-traveling avoiding difficult situation is specified, but the present invention is not necessarily limited thereto. For example, the blind control may be executed when the parallel-traveling avoiding control cannot resolve the parallel traveling state. In this case, the difficult-situation specifying unit 160 may determine that a situation in which the parallel-traveling avoiding control cannot resolve the parallel traveling state is the parallel-traveling avoiding difficult situation. When the traveling environment recognition unit 110 specifies that the subject vehicle and the adjacent vehicle are in the parallel traveling state, the blind control may be executed instead of executing the parallel-traveling avoiding control.

In the first embodiment, the type of the parallel-traveling avoiding control to be prioritized is switched according to whether the automation level of the subject vehicle is the congestion-only LV3 or the area-limited LV3. However, the present invention is not necessarily limited thereto. For example, regardless of whether the automation level of the subject vehicle is the congestion-only LV3 or the area-limited LV3, the type of the parallel-traveling avoiding control to be prioritized may not be switched.

In the first embodiment, the configuration in which the automation level of the subject vehicle can be switched to LV4 or higher level has been described, but the present invention is not necessarily limited thereto. For example, a configuration may be adopted, in which the automation level of the subject vehicle cannot be switched to LV4 or higher.

In the first embodiment, the vehicle system 1 includes the blind mechanism 17, and the automated driving ECU 10 includes the difficult-situation specifying unit 160 and the blind control unit 170. However, the present disclosure is not necessarily limited thereto. For example, the vehicle system 1 may not include the blind mechanism 17, and the automated driving ECU 10 may not include the difficult-situation specifying unit 160 and the blind control unit 170.

Second Embodiment

The present disclosure is not limited to the configuration described in the first embodiment, but can also adopt the following configurations of a second embodiment. The followings will describe an example of a configuration of the second embodiment with reference to the accompanying drawings. A vehicle system 1 of the second embodiment is similar to the vehicle system 1 of the first embodiment, except that the vehicle system 1 includes an automated driving ECU 10a instead of the automated driving ECU 10.

Figure 8:
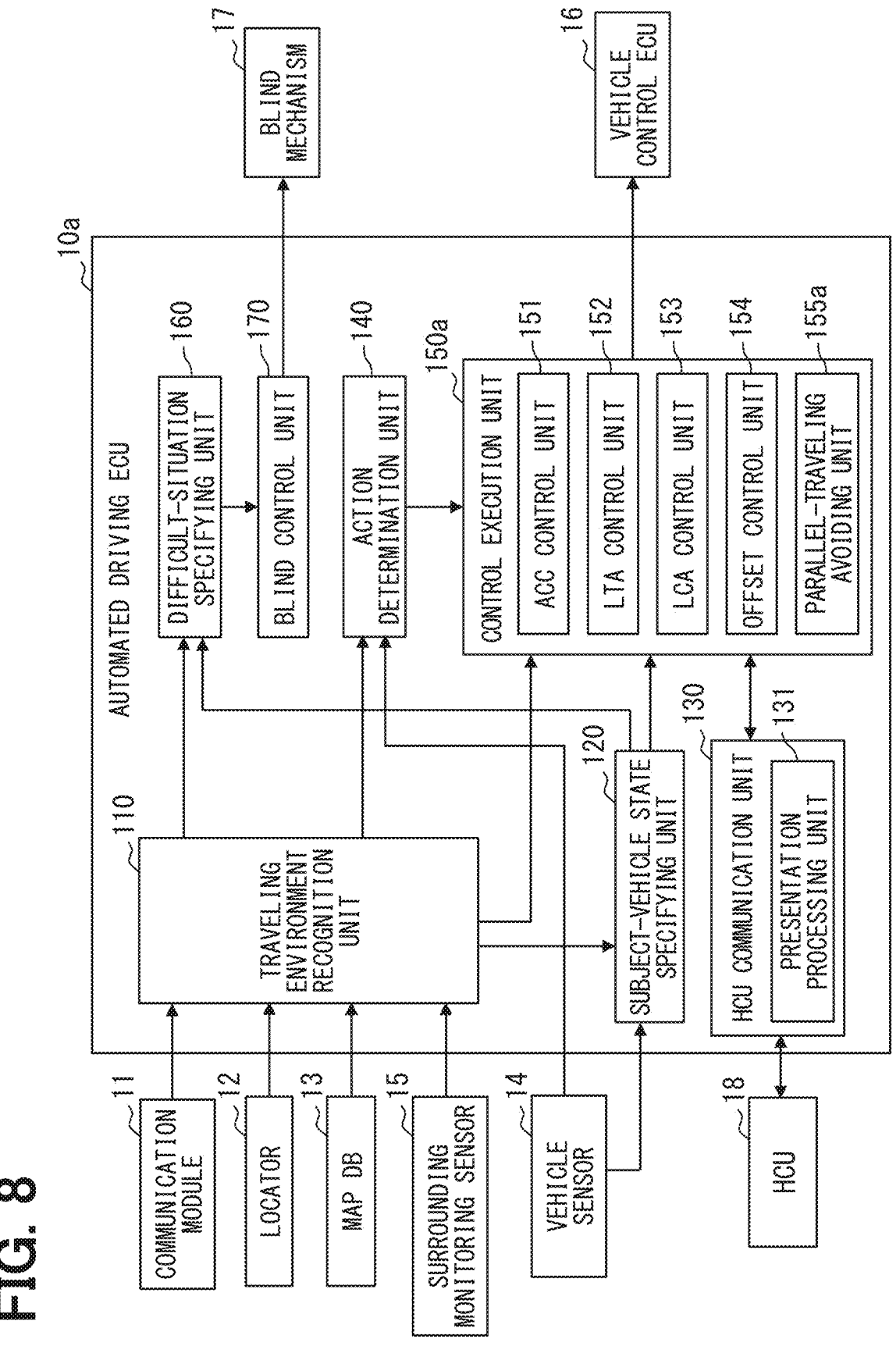
FIG. 8 is a diagram illustrating an example of a schematic configuration of an automated driving ECU.

Next, a schematic configuration of the automated driving ECU 10a will be described with reference to FIG. 8. As illustrated in FIG. 8, the automated driving ECU 10a includes a traveling environment recognition unit 110, a subject-vehicle state specifying unit 120, an HCU communication unit 130, an action determination unit 140, a control execution unit 150a, a difficult-situation specifying unit 160, and a blind control unit 170 as functional blocks. The automated driving ECU 10a is the same as the automated driving ECU 10 of the first embodiment except that the automated driving ECU 10a includes a control execution unit 150a instead of the control execution unit 150. The automated driving ECU 10a also corresponds to the vehicle control device. The execution of the processes of the functional blocks of the automated driving ECU 10a by the computer also corresponds to execution of a vehicle control method.

The control execution unit 150a includes an ACC control unit 151, an LTA control unit 152, an LCA control unit 153, an offset control unit 154, and a parallel-traveling avoiding unit 155a as sub-functional blocks. The control execution unit 150a is the same as the control execution unit 150 of the first embodiment except that the parallel-traveling avoiding unit 155a is provided instead of the parallel-traveling avoiding unit 155.

The parallel-traveling avoiding unit 155a is the same as the parallel-traveling avoiding unit 155 of the first embodiment except that a part of processing is different. Hereinafter, processing different from that of the first embodiment will be described. The parallel-traveling avoiding unit 155a does not execute the parallel-traveling avoiding control when there is no other vehicle in the adjacent lane on a lateral side of the subject vehicle facing in a confirmation direction. The confirmation direction is a lateral direction of the subject vehicle from the driver's seat toward a display 19 provided in a center console of the subject vehicle. The display 19 provided in the center console of the subject vehicle is, for example, a CID (Center Information Display). When the driver's seat of the subject vehicle is provided on the right side of the subject vehicle, the confirmation direction corresponds to a leftward direction from the driver's seat of the subject vehicle. When the driver's seat of the subject vehicle is provided on the left side of the subject vehicle, the confirmation direction corresponds to a rightward direction from the driver's seat of the subject vehicle. On the other hand, when another vehicle is present in the adjacent lane on the lateral side of the subject vehicle facing in the confirmation direction, the parallel-traveling avoiding control is executed.

According to this configuration, even when a parallel traveling vehicle is present on the lateral side of the subject vehicle to which the line of sight of the driver of the subject vehicle is likely to be directed during the driver's second task using the CID, the parallel traveling vehicle can be prevented from entering the field of view of the driver of the subject vehicle. Therefore, the driver of the subject vehicle is less likely to feel a sense of oppression caused when the second task is seen by an occupant of another vehicle. In addition, when a parallel traveling vehicle is present on a lateral side of the subject vehicle, but the parallel traveling vehicle is not located on the lateral side to which the line of sight of the driver is directed, unnecessary parallel-traveling avoiding control can be avoided.

Third Embodiment

The present disclosure is not limited to the configuration described in the first embodiment, but can also adopt the following configuration as a third embodiment. The followings will describe a example of a configuration of the third embodiment with reference to the drawings. A vehicle system 1 of the third embodiment is similar to the vehicle system 1 of the first embodiment, except that the vehicle system 1 includes an automated driving ECU 10b instead of the automated driving ECU 10.

Figure 9:
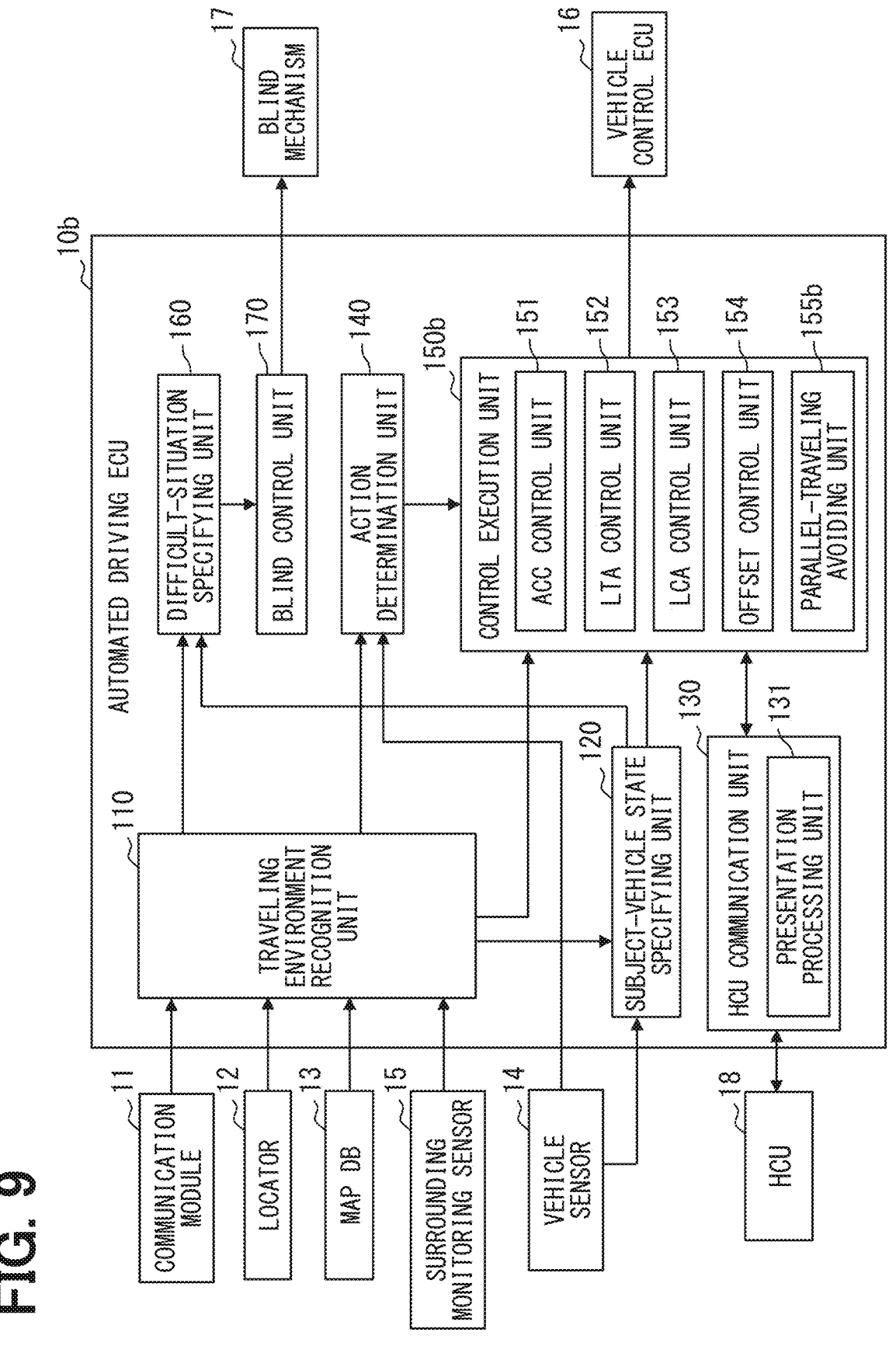
FIG. 9 is a diagram illustrating an example of a schematic configuration of an automated driving ECU.

Next, a schematic configuration of the automated driving ECU 10b will be described with reference to FIG. 9. As illustrated in FIG. 9, the automated driving ECU 10b includes a traveling environment recognition unit 110, a subject-vehicle state specifying unit 120, an HCU communication unit 130, an action determination unit 140, a control execution unit 150b, a difficult-situation specifying unit 160, and a blind control unit 170 as functional blocks. The automated driving ECU 10b is the same as the automated driving ECU 10 of the first embodiment except that the automated driving ECU 10b includes a control execution unit 150b instead of the control execution unit 150. The automated driving ECU 10b also corresponds to the vehicle control device. The execution of the processes of the functional blocks of the automated driving ECU 10b by the computer also corresponds to execution of a vehicle control method.

The control execution unit 150b includes an ACC control unit 151, an LTA control unit 152, an LCA control unit 153, an offset control unit 154, and a parallel-traveling avoiding unit 155b as sub-functional blocks. The control execution unit 150b is the same as the control execution unit 150 of the first embodiment except that the parallel-traveling avoiding unit 155b is provided instead of the parallel-traveling avoiding unit 155.

The parallel-traveling avoiding unit 155b is the same as the parallel-traveling avoiding unit 155 of the first embodiment except that a part of processing is different. Hereinafter, processing different from that of the first embodiment will be described. The parallel-traveling avoiding unit 155b may be allowed to execute the parallel-traveling avoiding control on a straight road. The straight road may be a road section in which the degree of curve is less than a specified value. As the degree of the curve, for example, a curvature may be used. The specified value is a value for distinguishing between a straight road and a curved road, and may be arbitrarily set. The parallel-traveling avoiding unit 155b may not execute the parallel-traveling avoiding control on the curved road. The curved road may be a road section in which the degree of curve is equal to or greater than the above-described specified value.

When the parallel-traveling avoiding control is estimated to be completed before the subject vehicle enters the curved road based on the traveling environment specified by the traveling environment recognition unit 110, the parallel-traveling avoiding unit 155b completes the parallel-traveling avoiding control before the subject vehicle enters the curved road. The completion of the parallel-traveling avoiding control before entering the curved road means that the parallel traveling state is resolved before entering the curved road. During traveling on a curved road, the parallel-traveling avoiding control may not be executed so as not to affect the speed control for traveling on the curved road.

According to the above configuration, since the parallel-traveling avoiding control is completed before the vehicle enters the curved road, it is possible to reduce the influence of the parallel-traveling avoiding control on the speed control for traveling on the curved road.

When the parallel-traveling avoiding control is estimated to be uncompleted before the subject vehicle enters the curved road based on the traveling environment specified by the traveling environment recognition unit 110, the parallel-traveling avoiding unit 155b advances the parallel-traveling avoiding control by a possible distance before the subject vehicle enters the curved road and temporarily stops the parallel-traveling avoiding control. Examples of the case where the parallel-traveling avoiding control cannot be completed before the subject vehicle enters the curved road include a case where the parallel traveling state cannot be resolved before the subject vehicle enters the curved road by the parallel-traveling avoiding control within the threshold range of the acceleration/deceleration allowed for the automated driving. Here, the possible distance may be a distance by which the subject vehicle can be shifted in the longitudinal direction relative to the parallel traveling vehicle until the subject vehicle enters the curved road by the parallel-traveling avoiding control within the threshold range of the acceleration/deceleration allowed for the automated driving. The temporarily stopped parallel-traveling avoiding control may be resumed when the subject vehicle exits the curved road. According to the above configuration, it is possible to reduce the influence of the parallel-traveling avoiding control on the speed control for causing the subject vehicle to travel on the curved road while shifting the subject vehicle in the longitudinal direction relative to the parallel traveling vehicle by the possible distance.

The parallel-traveling avoiding unit 155b estimates a travel distance or a travel time from the subject vehicle position to the entry point to the curved road. Then, the parallel-traveling avoiding control is executed so as to resolve the parallel traveling state within the range of the estimated travel distance or travel time. For example, when the parallel-traveling avoiding control is executed by the longitudinal control, the subject vehicle may be decelerated so as to resolve the parallel traveling state within the range of the estimated travel distance or travel time. When the parallel-traveling avoiding control is executed by the lateral control, the subject vehicle may change lanes so as to resolve the parallel traveling state within the range of the estimated travel distance or travel time.

Fourth Embodiment

The present disclosure is not limited to the configuration described in the first embodiment, but can also adopt the following configuration as a fourth embodiment. The followings will describe a detailed example of the fourth embodiment with reference to the drawings.

Figure 10:
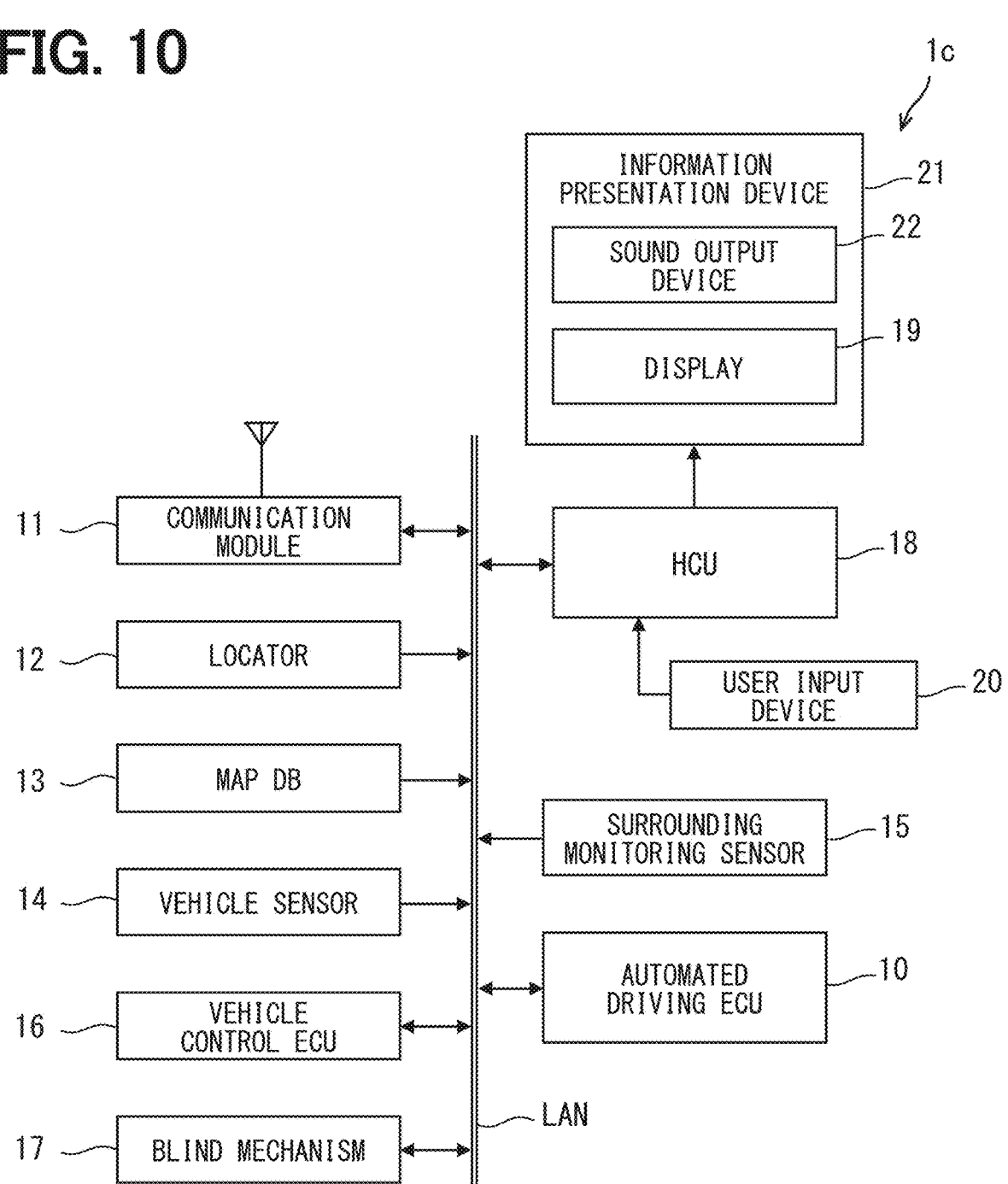
FIG. 10 is a schematic diagram illustrating a configuration of a vehicle system.

As illustrated in FIG. 10, a vehicle system 1c includes an automated driving ECU 10c, a communication module 11, a locator 12, a map DB 13, a vehicle sensor 14, a surrounding monitoring sensor 15, a vehicle control ECU 16, a blind mechanism 17, an HCU 18, a user input device 20, and an information presentation device 21. The vehicle system 1c is the same as the vehicle system 1 of the first embodiment except that the vehicle system 1c includes an automated driving ECU 10c and an information presentation device 21 instead of the automated driving ECU 10 and the display 19.

The information presentation device 21 presents information toward a vehicle cabin of the subject vehicle. The information presentation device 21 includes a display 19 and a sound output device 22. The sound output device 22 executes information presentation by outputting audio. Examples of the sound output device 22 include a speaker provided in the vehicle cabin of the subject vehicle.

Figure 11:
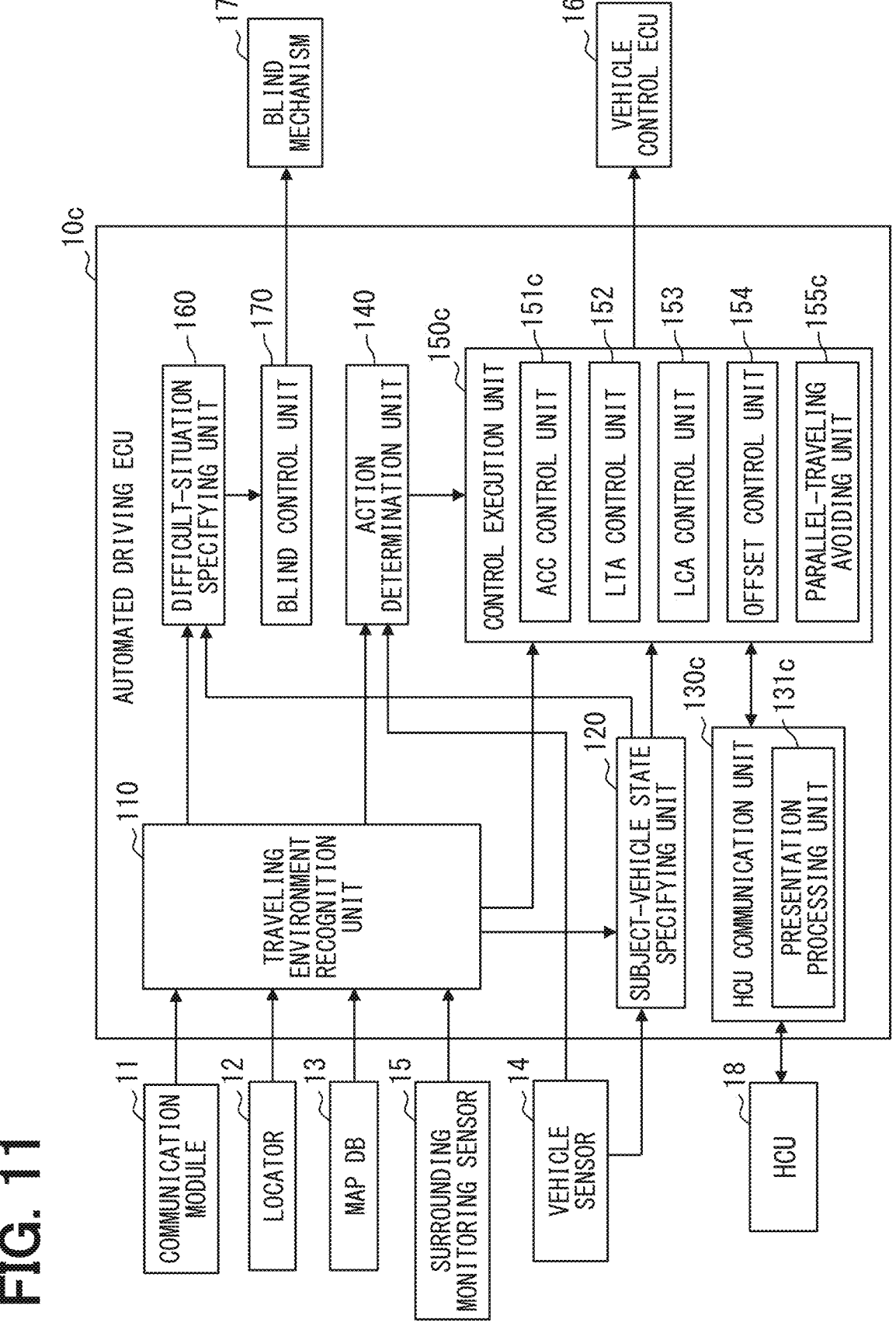
FIG. 11 is a diagram illustrating an example of a schematic configuration of an automated driving ECU.

Next, a schematic configuration of the automated driving ECU 10c will be described with reference to FIG. 11. As illustrated in FIG. 11, the automated driving ECU 10c includes a traveling environment recognition unit 110, a subject-vehicle state specifying unit 120, an HCU communication unit 130c, an action determination unit 140, a control execution unit 150c, a difficult-situation specifying unit 160, and a blind control unit 170 as functional blocks. The automated driving ECU 10c is the same as the automated driving ECU 10 of the first embodiment except that the automated driving ECU 10c includes an HCU communication unit 130c and a control execution unit 150c instead of the HCU communication unit 130 and the control execution unit 150. The automated driving ECU 10c also corresponds to the vehicle control device. The execution of the processes of the functional blocks of the automated driving ECU 10c by the computer also corresponds to execution of a vehicle control method.

The control execution unit 150c includes an ACC control unit 151c, an LTA control unit 152, an LCA control unit 153, an offset control unit 154, and a parallel-traveling avoiding unit 155c as sub-functional blocks. The control execution unit 150c is the same as the control execution unit 150 of the first embodiment except that the ACC control unit 151c and the parallel-traveling avoiding unit 155c are provided instead of the ACC control unit 151 and the parallel-traveling avoiding unit 155.

The ACC control unit 151c is the same as the ACC control unit 151 of the first embodiment except that the inter-vehicle distance set value is not limited to the value received from the driver via the user input device 20. For example, in the ACC control unit 151c, the inter-vehicle distance set value may be a default fixed value set in advance.

The parallel-traveling avoiding unit 155c is the same as the parallel-traveling avoiding unit 155 of the first embodiment except that a part of processing is different. Hereinafter, processing different from that of the first embodiment will be described. When the ACC control unit 151 is executing the following travel control and the longitudinal control needs to be executed beyond the allowable range of the target inter-vehicle distance, the parallel-traveling avoiding unit 155c executes the longitudinal control beyond the allowable range. The case where the longitudinal control needs to be executed beyond the allowable range of the target inter-vehicle distance means a case where the longitudinal control within the range of the allowable range of the target inter-vehicle distance cannot cause the subject vehicle and the adjacent vehicle to be out of the parallel traveling state.

The HCU communication unit 130c includes a presentation processing unit 131c as a sub-functional block. The HCU communication unit 130c is the same as the HCU communication unit 130 of the first embodiment except that the HCU communication unit 130c includes the presentation processing unit 131c instead of the presentation processing unit 131. The presentation processing unit 131c indirectly controls information presentation of the information presentation device 19c. The presentation processing unit 131c is the same as the presentation processing unit 131 of the first embodiment except that the presentation processing unit 131c indirectly controls not only display on the display 19 but also audio output from the sound output device 22. The presentation processing unit 131c corresponds to a presentation instruction unit.

When the vehicle deviates from the target inter-vehicle distance of the ACC control by the parallel-traveling avoiding control, the presentation processing unit 131c executes information presentation (hereinafter, referred to as temporary change presentation) indicating that the target inter-vehicle distance is temporarily changed and information presentation (hereinafter, referred to as parallel-traveling avoiding presentation) related to the parallel-traveling avoiding control. These pieces of information may be presented by display or by audio. The temporary change presentation may be executed by blinking the inter-vehicle distance set value (see DSV in FIG. 3) displayed on the display 19, for example. In addition, an audio explaining that the target inter-vehicle distance is temporarily changed may be output. The parallel-traveling avoiding presentation may be executed by causing the display 19 to display an image indicating that the subject vehicle and the adjacent vehicle are scheduled to be out of the parallel traveling state. In addition, an audio for explaining that the subject vehicle and the adjacent vehicle are scheduled to be out of the parallel traveling state may be output. According to this, the driver can easily recognize that the target inter-vehicle distance is temporarily changed in order to resolve the parallel traveling state between the subject vehicle and the adjacent vehicle.

Here, an example of display of an image (hereinafter, referred to as a parallel-traveling avoiding image) indicating that the parallel traveling state between the subject vehicle and the adjacent vehicle is scheduled to be resolved will be described with reference to FIG. 12. The parallel-traveling avoiding image may be displayed as one mode of an image (hereinafter, a surrounding situation image) indicating a surrounding situation of the subject vehicle. The surrounding situation image is displayed on a meter MID, for example. The surrounding situation image may be a bird's-eye view image of the subject vehicle and its surroundings, viewed from a virtual viewpoint above the subject vehicle. This virtual viewpoint may be at a position directly above the subject vehicle, or may be at a position shifted from the position directly above the subject vehicle. For example, the virtual viewpoint may be a bird's-eye view viewed from a virtual viewpoint above and behind the subject vehicle. The surrounding situation image may be a virtual image indicating the surrounding situation of the subject vehicle, or may be a processed image of a captured image captured by a surrounding monitoring camera of the surrounding monitoring sensor 15.

Figure 12:
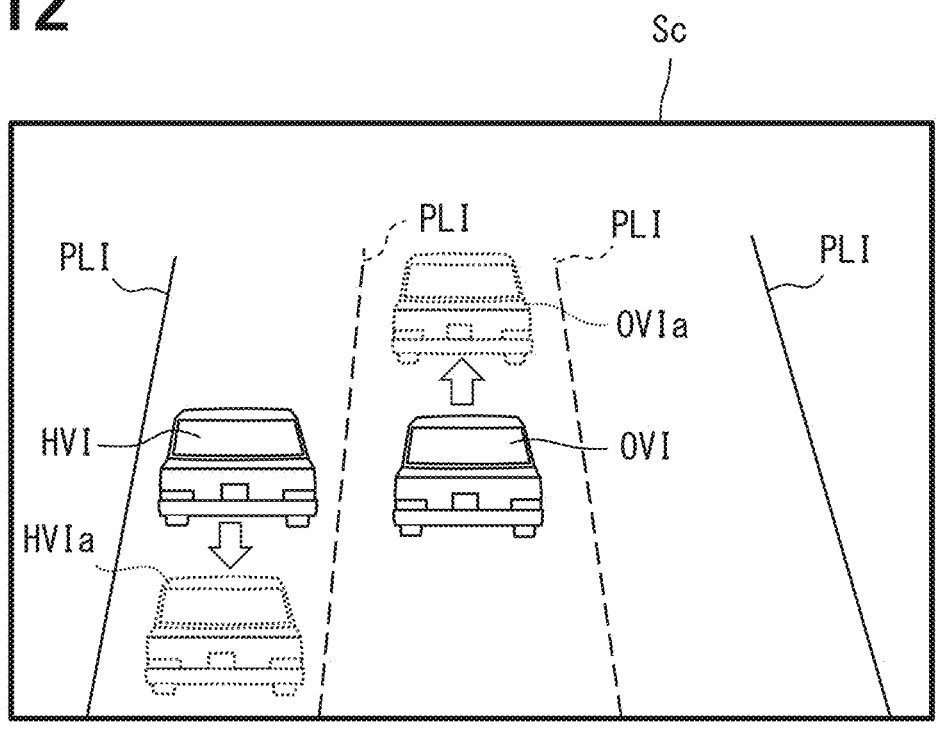
FIG. 12 is a diagram illustrating an example of display of a parallel-traveling avoiding image.

Sc in FIG. 12 indicates a display screen of the display 19. PLI in FIG. 12 indicates an image (hereinafter, referred to as a lane marking image) representing a lane marking of a lane. HVI in FIG. 12 indicates an image (hereinafter, referred to as a subject vehicle image) representing the subject vehicle. HVIa in FIG. 12 indicates an image (hereinafter, referred to as a subject-vehicle scheduled image) representing a scheduled position of the subject vehicle by the parallel-traveling avoiding control. OVI in FIG. 12 indicates an image (hereinafter, referred to as a surrounding vehicle image) representing a surrounding vehicle around the subject vehicle. OVIa of FIG. 12 illustrates an image (hereinafter, referred to as a surrounding-vehicle scheduled image) representing a scheduled position of the surrounding vehicle around the subject vehicle by the parallel-traveling avoiding control. As illustrated in FIG. 12, the parallel-traveling avoiding image may be expressed by the subject-vehicle scheduled image and the surrounding-vehicle scheduled image which represent, respectively, the subject vehicle and the adjacent vehicle whose parallel traveling state is scheduled to be resolved by the parallel-traveling avoiding control. The scheduled movement of the subject vehicle and the adjacent vehicle by the parallel-traveling avoiding control may be indicated by animation or may be indicated by other expressions.

Fifth Embodiment

The present disclosure is not limited to the configuration described in the first embodiment, but can also adopt the following configuration as a fifth embodiment. The followings will describe a detailed example of the fifth embodiment with reference to the drawings. A vehicle system 1 of the fifth embodiment is similar to the vehicle system 1 of the first embodiment, except that the vehicle system 1 includes an automated driving ECU 10*d* instead of the automated driving ECU 10.

Figure 13:
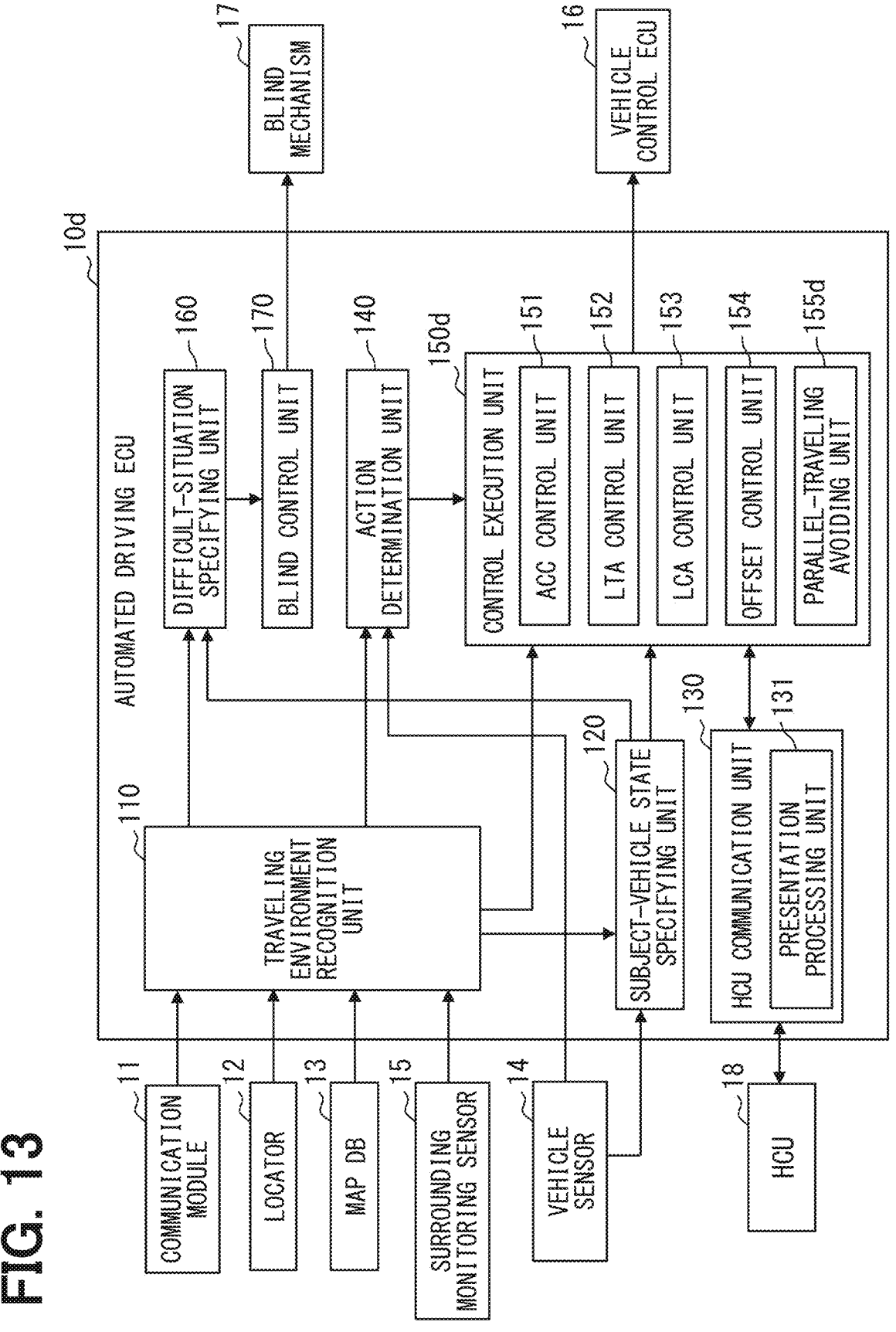
FIG. 13 is a diagram illustrating an example of a schematic configuration of an automated driving ECU.

Next, a schematic configuration of the automated driving ECU 10*d* will be described with reference to FIG. 13. As illustrated in FIG. 13, the automated driving ECU 10*d* includes a traveling environment recognition unit 110, a subject-vehicle state specifying unit 120, an HCU communication unit 130, an action determination unit 140, a control execution unit 150*d*, a difficult-situation specifying unit 160, and a blind control unit 170 as functional blocks. The automated driving ECU 10*d* is the same as the automated driving ECU 10 of the first embodiment except that the automated driving ECU 10*d* includes a control execution unit 150*d* instead of the control execution unit 150. The automated driving ECU 10*d* also corresponds to the vehicle control device. The execution of the processes of the functional blocks of the automated driving ECU 10*d* by the computer also corresponds to execution of a vehicle control method.

The control execution unit 150*d* includes an ACC control unit 151, an LTA control unit 152, an LCA control unit 153, an offset control unit 154, and a parallel-traveling avoiding unit 155*d* as sub-functional blocks. The control execution unit 150*d* is the same as the control execution unit 150 of the first embodiment except that the parallel-traveling avoiding unit 155*d* is provided instead of the parallel-traveling avoiding unit 155.

The parallel-traveling avoiding unit 155*d* is the same as the parallel-traveling avoiding unit 155 of the first embodiment except that a part of processing is different. Hereinafter, processing different from that of the first embodiment will be described. The parallel-traveling avoiding unit 155*d* does not execute the parallel-traveling avoiding control in a case where it is determined based on the traveling environment specified by the traveling environment recognition unit 110 that the subject vehicle is in the parallel traveling state with an adjacent vehicle traveling on a passing lane on a lateral side of the subject vehicle. The parallel-traveling avoiding unit 155*d* executes the parallel-traveling avoiding control in a case where it is determined based on the traveling environment specified by the traveling environment recognition unit 110 that the subject vehicle is in the parallel traveling state with an adjacent vehicle traveling on a lane on another lateral side of the subject vehicle opposite from the passing lane. The parallel-traveling avoiding unit 155*d* may determine whether the traveling lane of the adjacent vehicle is the passing lane based on the position of the adjacent vehicle and the high-definition map data.

A vehicle traveling on the passing lane often has a high vehicle speed for passing. Therefore, even when the adjacent vehicle on the passing lane and the subject vehicle are in the parallel traveling state, there is a high possibility that the parallel traveling state is quickly resolved. According to the configuration of the fifth embodiment, it is possible to omit the parallel-traveling avoiding control in such a situation in which the possibility that the parallel traveling state is naturally resolved is high. On the other hand, a vehicle traveling in a lane other than the passing lane often has a lower vehicle speed than a vehicle traveling in the passing lane. Therefore, when the adjacent vehicle in the lane that is not the passing lane and the subject vehicle are in the parallel traveling state, there is a high possibility that the parallel traveling state is not naturally resolved. According to the configuration of the fifth embodiment, it is possible to execute the parallel-traveling avoiding control in such a situation in which the possibility that the parallel traveling state is naturally resolved is low.

Sixth Embodiment

The present disclosure is not limited to the configuration described in the first embodiment, but can also adopt the following configuration in a sixth embodiment. The followings will describe a detailed example of the sixth embodiment with reference to the drawings. A vehicle system 1 of the sixth embodiment is similar to the vehicle system 1 of the first embodiment, except that the vehicle system 1 includes an automated driving ECU 10*e* instead of the automated driving ECU 10.

Figure 14:
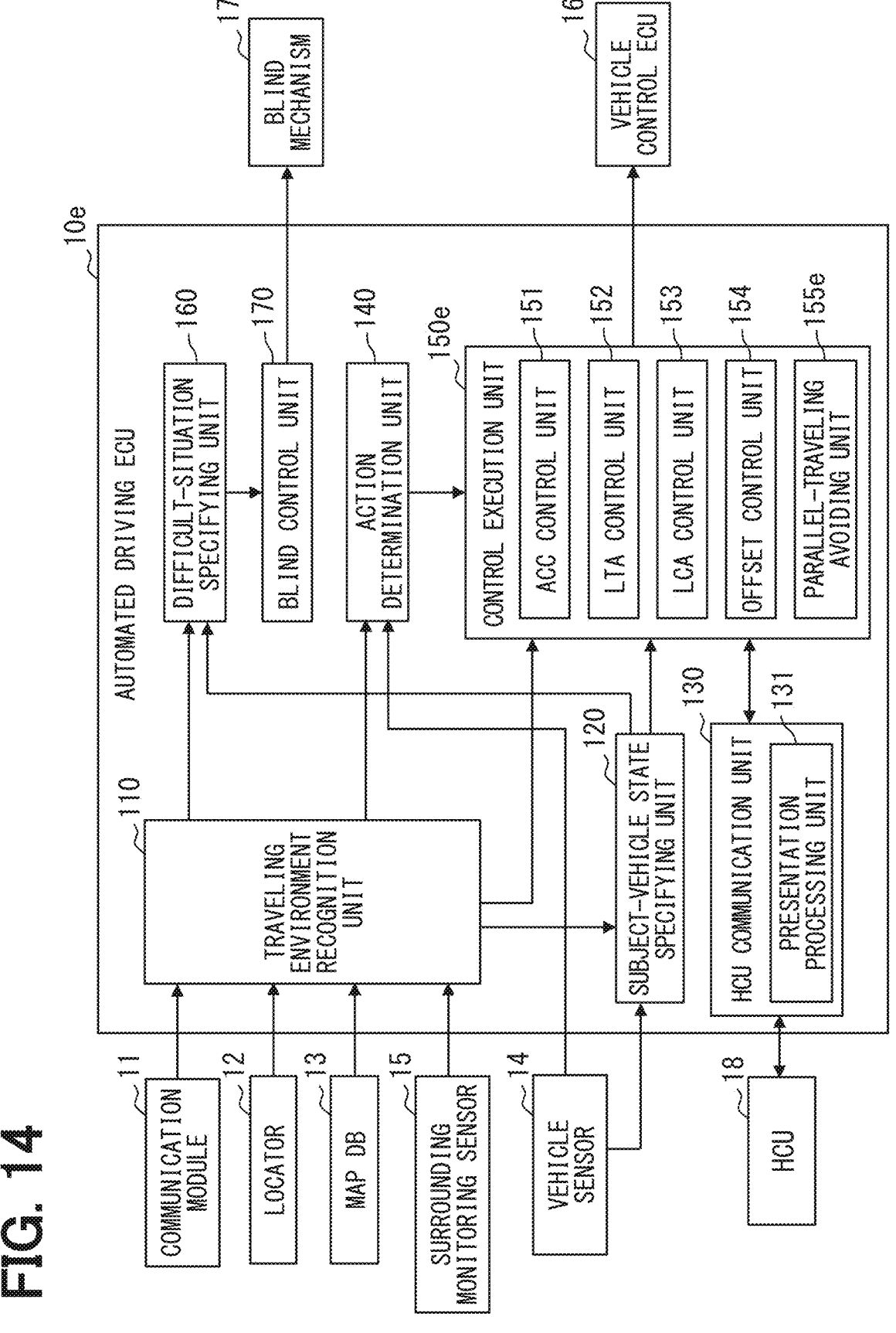
FIG. 14 is a diagram illustrating an example of a schematic configuration of an automated driving ECU.

Next, a schematic configuration of the automated driving ECU 10*e* will be described with reference to FIG. 14. As illustrated in FIG. 14, the automated driving ECU 10*e* includes a traveling environment recognition unit 110, a subject-vehicle state specifying unit 120, an HCU communication unit 130, an action determination unit 140, a control execution unit 150*e*, a difficult-situation specifying unit 160, and a blind control unit 170 as functional blocks. The automated driving ECU 10*e* is the same as the automated driving ECU 10 of the first embodiment except that the automated driving ECU 10*e* includes a control execution unit 150*e* instead of the control execution unit 150. The automated driving ECU 10*e* also corresponds to the vehicle control device. The execution of the processes of the functional blocks of the automated driving ECU 10*e* by the computer also corresponds to execution of a vehicle control method.

The control execution unit 150*e* includes an ACC control unit 151, an LTA control unit 152, an LCA control unit 153, an offset control unit 154, and a parallel-traveling avoiding unit 155*e* as sub-functional blocks. The control execution unit 150*e* is the same as the control execution unit 150 of the first embodiment except that the parallel-traveling avoiding unit 155*e* is provided instead of the parallel-traveling avoiding unit 155.

The parallel-traveling avoiding unit 155*e* is the same as the parallel-traveling avoiding unit 155 of the first embodiment except that a part of processing is different. Hereinafter, processing different from that of the first embodiment will be described. The parallel-traveling avoiding unit 155*e* executes the parallel-traveling avoiding control such that the subject vehicle continues to travel in a positional relationship in which the subject vehicle does not overtake an adjacent vehicle when it is determined based on the traveling environment specified by the traveling environment recognition unit 110 that the subject vehicle and the adjacent vehicle are about to become in the parallel traveling state. According to this configuration, it is possible to further reduce the feeling of oppression felt by the driver of the subject vehicle compared to a case where the parallel traveling state is resolved after the subject vehicle enters the parallel traveling state with the adjacent vehicle.

The parallel-traveling avoiding unit 155e may execute the parallel-traveling avoiding control for accelerating the subject vehicle with respect to the adjacent vehicle approaching the subject vehicle from behind. The parallel-traveling avoiding unit 155e may execute the parallel-traveling avoiding control for decelerating the subject vehicle with respect to the adjacent vehicle approaching the subject vehicle from ahead. In addition, in a case where an adjacent vehicle approaches the subject vehicle, the parallel-traveling avoiding unit 155e may execute the parallel-traveling avoiding control for changing lanes if it is possible to change lanes to a side where the adjacent vehicle is not present. In a case where the adjacent vehicle becomes in the parallel traveling state despite the parallel-traveling avoiding control of the sixth embodiment, the parallel-traveling avoiding unit 155e may execute the parallel-traveling avoiding control for resolving the parallel traveling state.

Seventh Embodiment

The present disclosure is not limited to the configuration described in the first embodiment, but can also adopt the following configuration in a seventh embodiment. The followings will describe a detailed example of the seventh embodiment with reference to the drawings. A vehicle system 1 of the seventh embodiment is similar to the vehicle system 1 of the first embodiment, except that the vehicle system 1 includes an automated driving ECU 10f instead of the automated driving ECU 10.

Figure 15:
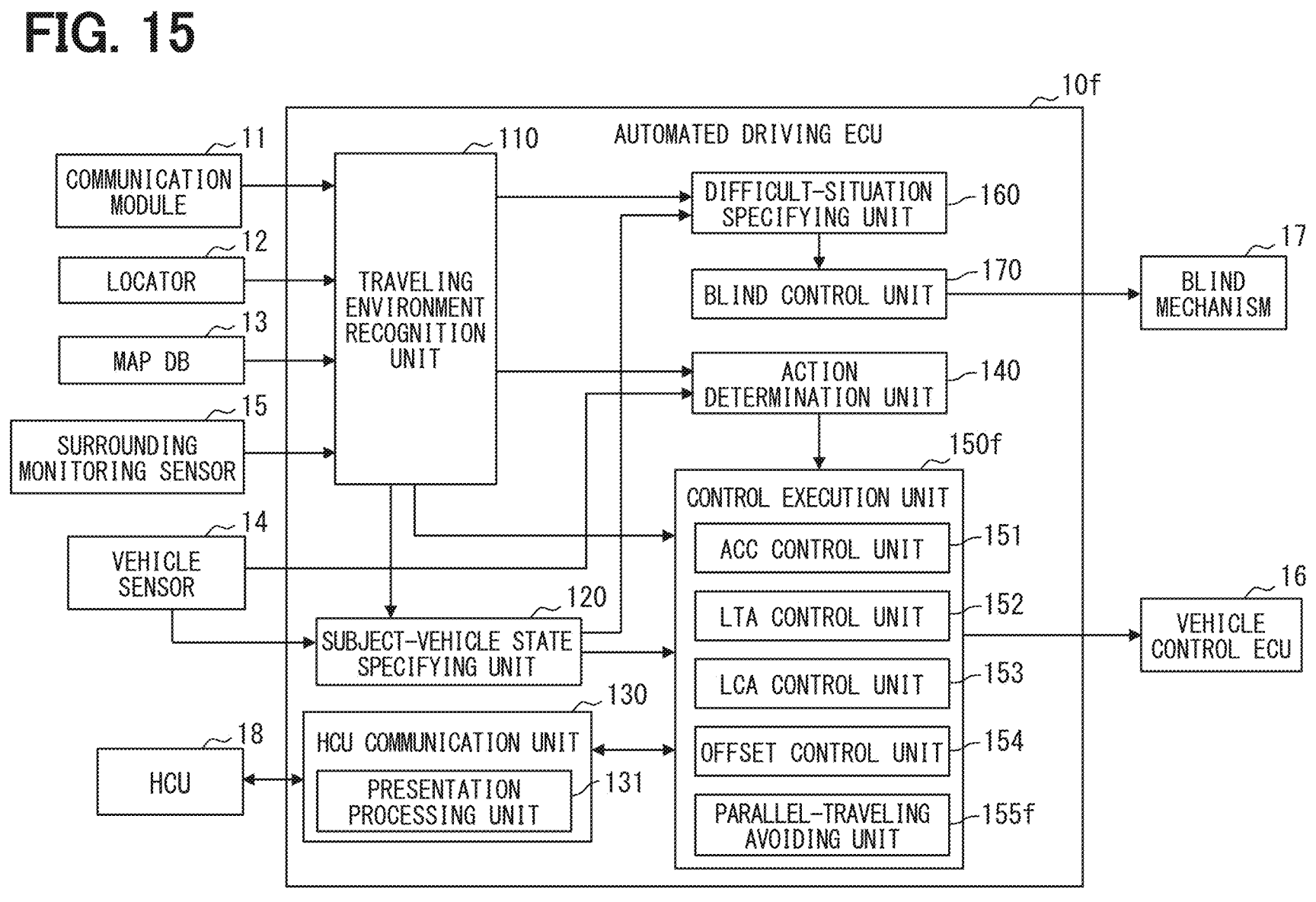

Next, a schematic configuration of the automated driving ECU 10f will be described with reference to FIG. 15. As illustrated in FIG. 15, the automated driving ECU 10f includes a traveling environment recognition unit 110, a subject-vehicle state specifying unit 120, an HCU communication unit 130, an action determination unit 140, a control execution unit 150f, a difficult-situation specifying unit 160, and a blind control unit 170 as functional blocks. The automated driving ECU 10f is the same as the automated driving ECU 10 of the first embodiment except that the automated driving ECU 10f includes a control execution unit 150f instead of the control execution unit 150. The automated driving ECU 10f also corresponds to the vehicle control device. The execution of the processes of the functional blocks of the automated driving ECU 10f by the computer also corresponds to execution of a vehicle control method.

The control execution unit 150f includes an ACC control unit 151, an LTA control unit 152, an LCA control unit 153, an offset control unit 154, and a parallel-traveling avoiding unit 155f as sub-functional blocks. The control execution unit 150f is the same as the control execution unit 150 of the first embodiment except that the parallel-traveling avoiding unit 155f is provided instead of the parallel-traveling avoiding unit 155.

The parallel-traveling avoiding unit 155f is the same as the parallel-traveling avoiding unit 155 of the first embodiment except that a part of processing is different. Hereinafter, processing different from that of the first embodiment will be described. The parallel-traveling avoiding unit 155f executes the parallel-traveling avoiding control by executing lane change when the execution of the parallel-traveling avoiding control using the longitudinal control has continued for a predetermined time or more and it is determined based on the traveling environment specified by the traveling environment recognition unit 110 that lane change is possible. Accordingly, even when the parallel traveling state between the subject vehicle and the adjacent vehicle cannot be resolved by the longitudinal control, the parallel traveling state can be resolved by the lateral control. The predetermined time mentioned here may be a time that can be arbitrarily set. The parallel-traveling avoiding control using the longitudinal control may be a parallel-traveling avoiding control using any of the longitudinal controls described in the above embodiments. The parallel-traveling avoiding unit 155f determines whether the lane change is possible based on the traveling environment specified by the traveling environment recognition unit 110. In the parallel-traveling avoiding control by the lane change, the parallel-traveling avoiding unit 155f executes the lane change to the adjacent lane in a direction where the lane change is determined to be possible. The parallel-traveling avoiding unit 155f may cause the LCA control unit 153 to execute the lane change.

The parallel-traveling avoiding unit 155f may add a condition that the execution of the ACC control has continued for a predetermined time or more to conditions for executing the parallel-traveling avoiding control by the lane change. When the parallel-traveling avoiding control by lane change is executed, the parallel-traveling avoiding unit 155f may execute lane change behind another vehicle located in a traveling lane that is a destination of the lane change, but does not execute lane change in a predetermined range in front of the other vehicle. This is to make it difficult to disturb the traveling of the other vehicle located in the traveling lane that is the destination of the lane change. The predetermined range mentioned here may be a distance that can be arbitrarily set. For example, the predetermined range may be a distance at which it is estimated that at least sudden braking does not need to be executed on the other vehicle behind the subject vehicle.

Eighth Embodiment

In the above-described embodiments, the automated driving ECUs 10, 10a, 10b, 10c, 10d, 10e, and 10f include the traveling environment recognition unit 110. However, the present disclosure is not necessarily limited thereto. For example, an ECU other than the automated driving ECUs 10, 10a, 10b, 10c, 10d, 10e, and 10f may execute the function of the traveling environment recognition unit 110. In this case, the automated driving ECUs 10, 10a, 10b, 10c, 10d, 10e, and 10f may acquire information on the traveling environment recognized by the ECU having the function of the traveling environment recognition unit 110 and specify the traveling environment. In this case, a functional block that specifies the traveling environment in the automated driving ECUs 10, 10a, 10b, 10c, 10d, 10e, and 10f corresponds to the traveling environment specifying unit.

Ninth Embodiment

In the above-described embodiments, the automated driving ECUs 10, 10a, 10b, 10c, 10d, 10e, and 10f include the blind control unit 170. However, the present disclosure is not necessarily limited thereto. For example, an ECU other than the automated driving ECUs 10, 10a, 10b, 10c, 10d, 10e, and 10f may execute the function of the blind control unit 170. In this case, the automated driving ECUs 10, 10a, 10b, 10c, 10d, 10e, and 10f may be configured to output an instruction to the ECU having the function of the blind control unit 170 to execute the blind control.

The present disclosure is not limited to the embodiments described above, and various modifications are possible within the scope of the claims. An embodiment obtained by appropriately combining technical means disclosed in different embodiments is also included in the technical scope of the present disclosure. The control device and the control method described in the present disclosure may be implemented by a special purpose computer which includes a processor programmed to execute one or more functions executed by computer programs. Also, the device and the method therefor which have been described in the present disclosure may be also realized by a special purpose hardware logic circuit. Alternatively, the device and the method described in the present disclosure may be implemented by one or more special purpose computers configured by a combination of a processor executing a computer program and one or more hardware logic circuits. The computer program may be stored in a computer-readable non-transition tangible storage medium as an instruction executed by a computer.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle control device configured to be used in a subject vehicle configured to execute automated driving without monitoring obligation, the automated driving without monitoring obligation being automated driving in which there is no obligation of surrounding monitoring, the vehicle control device comprising:

at least one processor; and at least one memory storing a program configured to, when executed by the at least one processor, cause the at least one processor to:

specify a traveling environment of the subject vehicle; and execute parallel-traveling avoiding control based on the traveling environment specified by the at least one processor during the automated driving without monitoring obligation, the parallel-traveling avoiding control being travel control of the subject vehicle to avoid a parallel traveling state in which the subject vehicle and an adjacent vehicle travel in parallel, the adjacent vehicle traveling in an adjacent lane adjacent to a traveling lane of the subject vehicle, wherein the at least one processor is configured to execute at least one of longitudinal controls as the parallel-traveling avoiding control, the longitudinal controls including control for decreasing an inter-vehicle distance between the subject vehicle and a preceding vehicle traveling ahead of the vehicle, control for increasing the inter-vehicle distance between the subject vehicle and the preceding vehicle, control for accelerating the subject vehicle, and control for decelerating the subject vehicle, the automated driving without monitoring obligation includes congestion-only automated driving in which the automated driving without monitoring obligation is permitted only during traffic congestion, the longitudinal controls include forward controls and backward controls, the forward controls include the control for decreasing the inter-vehicle distance between the subject vehicle and the preceding vehicle, and the control for accelerating the subject vehicle, the backward controls include the control for increasing the inter-vehicle distance between the subject vehicle and the preceding vehicle, and the control for decelerating the subject vehicle, and the at least one processor is configured to execute at least one of the forward controls during the congestion-only automated driving in priority over the backward controls.

2. The vehicle control device according to claim 1, wherein the subject vehicle is configured to switch between the automated driving without monitoring obligation and automated driving with monitoring obligation that is automated driving in which there is obligation of surroundings monitoring, and the at least one processor is configured not to execute the parallel-traveling avoiding control during the automated driving with monitoring obligation.

3. The vehicle control device according to claim 1, wherein the at least one processor is configured to execute the parallel-traveling avoiding control when there is another vehicle in the adjacent lane on a lateral side of the subject vehicle facing in a confirmation direction, the confirmation direction being a lateral direction of the subject vehicle from a driver's seat of the subject vehicle toward a display provided in a center console of the subject vehicle, and the at least one processor is configured not to execute the parallel-traveling avoiding control when there is no vehicle in the adjacent lane on the lateral side of the subject vehicle facing in the confirmation direction.

4. The vehicle control device according to claim 1, wherein the at least one processor is configured to be allowed to execute the parallel-traveling avoiding control in a straight road having a degree of curve lower than a predetermined value, the at least one processor is configured to complete the parallel-traveling avoiding control before the subject vehicle enters a curved road having a degree of curve higher than or equal to the predetermined value when the parallel-traveling avoiding control is estimated to be completed before the subject vehicle enters the curved road based on the traveling environment specified by the at least one processor, and the at least one processor is configured to activate the parallel-traveling avoiding control by a possible distance before the subject vehicle enters the curved road and then stops the parallel-traveling avoiding control when the parallel-traveling avoiding control is estimated to be uncompleted before the subject vehicle enters the curved road based on the traveling environment specified by the at least one processor.

5. The vehicle control device according to claim 1, wherein the automated driving without monitoring obligation further includes area-limited automated driving in which the automated driving without monitoring obligation is permitted in a limited area, the subject vehicle is configured to switch between the area-limited automated driving and the congestion-only automated driving, the at least one processor is configured to execute at least one of the backward controls during the area-limited automated driving in priority over the forward controls.

6. The vehicle control device according to claim 1, wherein control among the longitudinal controls other than the control for decelerating the subject vehicle is defined as control other than the control for decelerating the subject vehicle, and the at least one processor is configured to execute the control for decelerating the subject vehicle in priority over the control other than the control for decelerating the subject vehicle when the adjacent vehicle is determined to be located in a passing lane based on the traveling environment specified by the at least one processor.

7. The vehicle control device according to claim 1, wherein the at least one processor is configured to execute following travel control of the subject vehicle such that the subject vehicle follows the preceding vehicle at a target inter-vehicle distance, the target inter-vehicle distance depending on a set value received via an input device from a driver of the subject vehicle and having a constant allowable range for each set value, and the at least one processor is configured to cause a display to display the set value received from the driver of the subject vehicle via the input device, the at least one processor is configured to execute at least one of the longitudinal controls as the parallel-traveling avoiding control within the constant allowable range, and the at least one processor is configured to display the set value received from the driver via the input device even during the parallel-traveling avoiding control.

8. The vehicle control device according to claim 1, wherein the at least one processor is configured to execute following travel control of the subject vehicle such that the subject vehicle follows the preceding vehicle at a target inter-vehicle distance, the at least one processor is configured to cause an information presentation device to present information toward a vehicle cabin of the subject vehicle, wherein the at least one processor is configured to present information indicating that the target inter-vehicle distance is changed and information related to execution of the parallel-traveling avoiding control when the subject vehicle deviates from the target inter-vehicle distance due to the parallel-traveling avoiding control.

9. The vehicle control device according to claim 1, wherein the at least one processor is configured not to execute the parallel-traveling avoiding control when it is determined based on the traveling environment specified by the at least one processor that the subject vehicle is in the parallel traveling state with the adjacent vehicle traveling on a passing lane on a lateral side of the subject vehicle, and the at least one processor is configured to execute the parallel-traveling avoiding control when it is determined based on the traveling environment specified by the at least one processor that the subject vehicle is in the parallel traveling state with the adjacent vehicle traveling on a lane on another lateral side of the subject vehicle opposite from the passing lane.

10. The vehicle control device according to claim 1, wherein the at least one processor is configured to execute the parallel-traveling avoiding control such that the subject vehicle continues to travel in a positional relationship in which the subject vehicle does not pass the adjacent vehicle when it is determined based on the traveling environment specified by the at least one processor that the subject vehicle and the adjacent vehicle are about to become in the parallel traveling state.

11. The vehicle control device according to claim 1, wherein the at least one processor is configured to execute the parallel-traveling avoiding control by executing lane change when execution of the at least one of the longitudinal controls has continued for a predetermined time or more and it is determined based on the traveling environment specified by the at least one processor that lane change is possible.

12. The vehicle control device according to claim 11, wherein the at least one processor is configured to execute the lane change behind another vehicle located in a traveling lane that is a destination of the lane change, and the at least one processor is configured not to execute the lane change in a predetermined range in front of the other vehicle.

13. The vehicle control device according to claim 1, wherein the at least one processor is configured to execute offset control for offsetting a traveling position of the subject vehicle in a vehicle width direction such that a distance from the subject vehicle to a vehicle located on a lateral side of the subject vehicle is automatically increased, wherein the at least one processor is configured to execute the parallel-traveling avoiding control in parallel with the offset control in a situation where the offset control by the at least one processor is required.

14. The vehicle control device according to claim 1, wherein the at least one processor is configured to specify a stop of the subject vehicle in traffic congestion, wherein the at least one processor is configured not to execute the parallel-traveling avoiding control when the at least one processor has specified the stop of the subject vehicle in traffic congestion.

15. A vehicle control device configured to be used in a subject vehicle configured to execute automated driving without monitoring obligation, the automated driving without monitoring obligation being automated driving in which there is no obligation of surrounding monitoring, the vehicle control device comprising:

at least one processor; and at least one memory storing a program configured to, when executed by the at least one processor, cause the at least one processor to:

specify a traveling environment of the subject vehicle; and execute parallel-traveling avoiding control based on the traveling environment specified by the at least one processor during the automated driving without monitoring obligation, the parallel-traveling avoiding control being travel control of the subject vehicle to avoid a parallel traveling state in which the subject vehicle and an adjacent vehicle travel in parallel, the adjacent vehicle traveling in an adjacent lane adjacent to a traveling lane of the subject vehicle, wherein the subject vehicle includes a blind mechanism configured to obstruct view from an occupant of the adjacent vehicle in the parallel traveling state to an inside of the vehicle cabin, wherein the at least one processor is configured to specify a parallel-traveling avoiding difficult situation in which the parallel-traveling avoiding control is difficult to cause the adjacent vehicle and the subject vehicle from becoming out of the parallel traveling state, and the at least one processor is configured to execute blind control to operate the blind mechanism when the at least one processor specifies the parallel-traveling avoiding difficult situation during the automated driving without monitoring obligation.

16. The vehicle control device according to claim 15, wherein the at least one processor is configured to determine that at least one of situations where the subject vehicle is stopped and where it is difficult to move a position of the subject vehicle relative to preceding and following vehicles back and forth is the parallel-traveling avoiding difficult situation.

17. The vehicle control device according to claim 15, wherein the automated driving without monitoring obligation includes sleeping-allowed automated driving in which a driver of the subject vehicle is permitted to sleep, and sleeping-disallowed automated driving in which the drive is not permitted to sleep, the subject vehicle is configured to switch between the sleeping-allowed automated driving and the sleeping-disallowed automated driving, the at least one processor is configured to be prohibited to execute the blind control during the sleeping-disallowed automated driving, and the at least one processor is configured to be permitted to execute the blind control during the sleeping-allowed automated driving.

18. A vehicle control method executed by at least one processor in a subject vehicle configured to execute automated driving without monitoring obligation, the automated driving without monitoring obligation being automated driving in which there is no obligation of surrounding monitoring, the method comprising:

specifying a traveling environment of the subject vehicle; and executing parallel-traveling avoiding control based on the traveling environment specified in the specifying during the automated driving without monitoring obligation, the parallel-traveling avoiding control being travel control of the subject vehicle to avoid a parallel traveling state in which the subject vehicle and an adjacent vehicle travel in parallel, the adjacent vehicle traveling in an adjacent lane adjacent to a traveling lane of the subject vehicle, wherein the executing of the parallel-traveling avoiding control includes executing at least one of longitudinal controls as the parallel-traveling avoiding control, the longitudinal controls including control for decreasing an inter-vehicle distance between the subject vehicle and a preceding vehicle traveling ahead of the vehicle, control for increasing the inter-vehicle distance between the subject vehicle and the preceding vehicle, control for accelerating the subject vehicle, and control for decelerating the subject vehicle, the automated driving without monitoring obligation includes congestion-only automated driving in which the automated driving without monitoring obligation is permitted only during traffic congestion, the longitudinal controls include forward controls and backward controls, the forward controls include the control for decreasing the inter-vehicle distance between the subject vehicle and the preceding vehicle, and the control for accelerating the subject vehicle, the backward controls include the control for increasing the inter-vehicle distance between the subject vehicle and the preceding vehicle, and the control for decelerating the subject vehicle, and the executing of the parallel-traveling avoiding control includes executing at least one of the forward controls during the congestion-only automated driving in priority over the backward controls.

19. A vehicle control method executed by at least one processor in a subject vehicle configured to execute automated driving without monitoring obligation, the automated driving without monitoring obligation being automated driving in which there is no obligation of surrounding monitoring, the method comprising:

specifying a traveling environment of the subject vehicle;

executing parallel-traveling avoiding control based on the traveling environment specified in the specifying during the automated driving without monitoring obligation, the parallel-traveling avoiding control being travel control of the subject vehicle to avoid a parallel traveling state in which the subject vehicle and an adjacent vehicle travel in parallel, the adjacent vehicle traveling in an adjacent lane adjacent to a traveling lane of the subject vehicle;

specifying a parallel-traveling avoiding difficult situation in which the parallel-traveling avoiding control is difficult to cause the adjacent vehicle and the subject vehicle from becoming out of the parallel traveling state; and executing blind control to operate a blind mechanism when the parallel-traveling avoiding difficult situation is specified during the automated driving without monitoring obligation, wherein the subject vehicle includes the blind mechanism configured to obstruct view from an occupant of the adjacent vehicle in the parallel traveling state to an inside of the vehicle cabin.

\* \* \* \* \*